United States Patent
Ohashi et al.

(10) Patent No.: US 6,476,284 B1
(45) Date of Patent: Nov. 5, 2002

(54) METHOD OF DEHALOGENATING HYDROCARBON CONTAINING CARBON-CARBON DOUBLE BOND

(75) Inventors: Koichi Ohashi; Tsutomu Takashima; Teruhisa Kuroki, all of Kawasaki; Koji Fujimura, Kisarazu; Yuichi Tokumoto, Chigasaki, all of (JP)

(73) Assignee: Nippon Petrochemicals Company, Limited, Tokyo (JP)

( * ) Notice: Subject to any disclaimer, the term of this patent is extended or adjusted under 35 U.S.C. 154(b) by 0 days.

(21) Appl. No.: 09/673,864

(22) PCT Filed: Feb. 23, 2000

(86) PCT No.: PCT/JP00/01036
§ 371 (c)(1),
(2), (4) Date: Oct. 19, 2000

(87) PCT Pub. No.: WO00/50472
PCT Pub. Date: Aug. 31, 2000

(30) Foreign Application Priority Data

Feb. 23, 1999 (JP) .............................. 11-044409
Oct. 8, 1999 (JP) .............................. 11-288366
Oct. 29, 1999 (JP) .............................. 11-308723

(51) Int. Cl.[7] .................. C10G 45/00; C10G 17/00; C07C 7/00; C07C 2/02
(52) U.S. Cl. .................. 585/525; 585/861; 585/868; 208/262.1; 208/262.5; 208/263
(58) Field of Search .................. 208/262.1, 262.5, 208/263; 583/861, 868, 525

(56) References Cited

U.S. PATENT DOCUMENTS

| 4,152,499 A | 5/1979 | Boerzel et al. ............ 526/52.4 |
| 4,417,091 A | 11/1983 | Gaillard ...................... 585/823 |
| 4,605,808 A | 8/1986 | Samson ...................... 585/525 |
| 5,012,030 A | 4/1991 | Lane et al. .................. 585/527 |
| 5,288,849 A | 2/1994 | Garcin et al. ............... 585/482 |

FOREIGN PATENT DOCUMENTS

| JP | 57-183726 | 11/1982 |
| JP | 4-110305 | 4/1992 |
| JP | 6-28725 | 4/1994 |

OTHER PUBLICATIONS

Puskas et al, "The Nature of the Double Bond in Low Molecular Weight Polyisobutylenes and 'Polybutene' Copolymers," *J. Polymer Sci*, Symposium No. 56, pps. 191–202 (1976).

*Primary Examiner*—Walter D. Griffin
*Assistant Examiner*—Tam M. Nguyen
(74) *Attorney, Agent, or Firm*—Hollander Law Firm, P.L.C.

(57) ABSTRACT

An efficient dehalogenation can be carried out by a method which comprises treating an organic compound containing a compound of halogen, such as fluorine or chlorine, as an impurity and having non-conjugated carbon-carbon double bonds, for example, butene polymer produced with a boron trifluoride catalyst, with an inorganic solid treating agent containing aluminum atoms. When the dehalogenation is conducted in the presence of a basic substance such as ammonia or an amine, it can be continued over long while inhibiting the isomerization of the non-conjugated carbon-carbon double bonds.

43 Claims, 2 Drawing Sheets

C-H DIRECT CORRELATION SPECTRUM (HSQC METHOD)

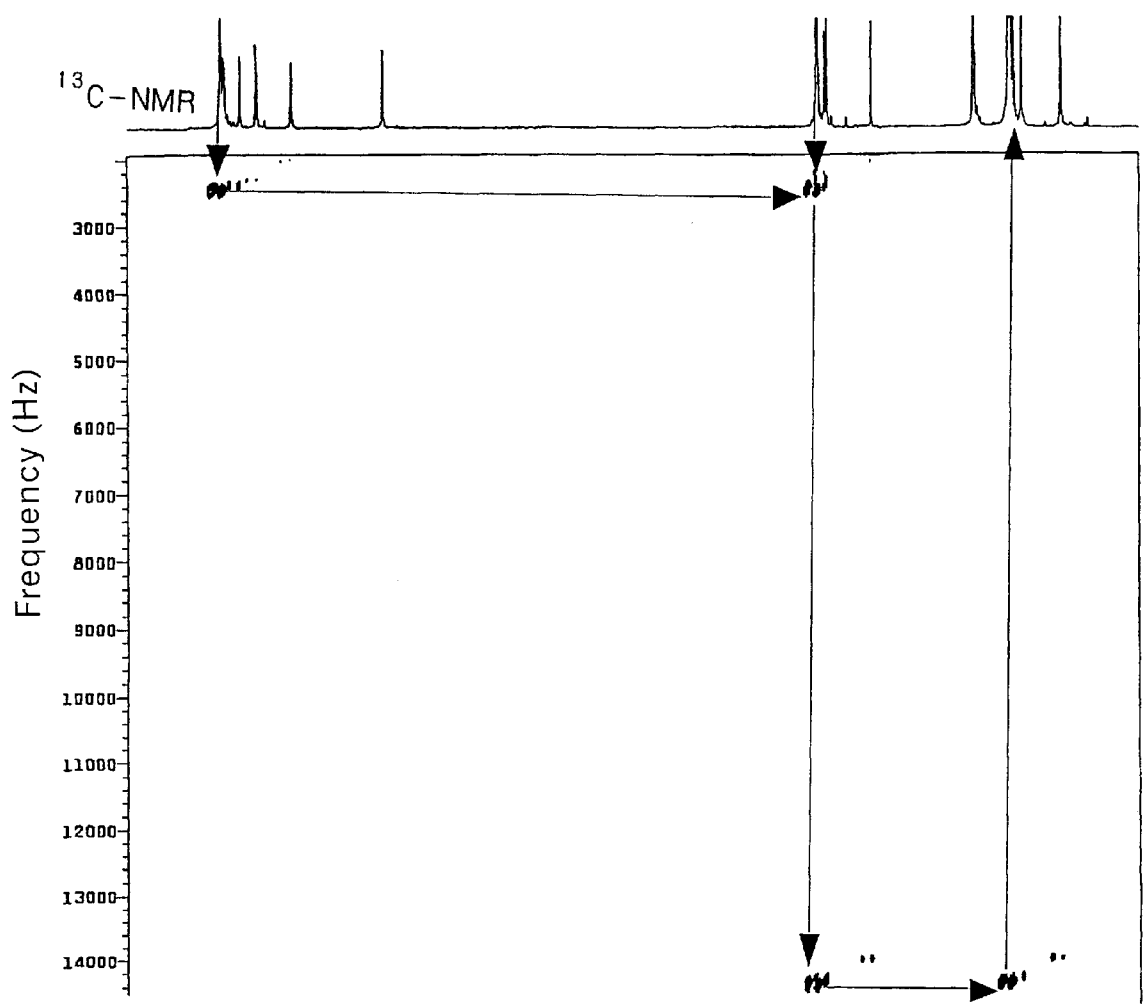

METHOD OF DEHALOGENATING HYDROCARBON CONTAINING CARBON-CARBON DOUBLE BOND

TECHNICAL FIELD

The present invention relates to a novel method for removing halogens such as fluorine and chlorine in olefin compounds using inorganic solid agent containing aluminum atoms. The halogen is contained as trace residual impurities in the olefin compounds in the forms of organic compounds, inorganic compounds or mixtures of them. Furthermore, the method of the present invention is characterized in that the isomerization of non-conjugated carbon-carbon double bonds in the olefin compounds can be suppressed substantially. Especially, even in the removal treatment done for a long period time, the present invention provides a method to suppress the above-mentioned isomerization substantially. Still further, the present invention relates to a method for producing highly reactive butene oligomers, in which the above method is applied to butene oligomers that is obtained by polymerization of butenes, thereby effectively reducing the content of terminal fluorinated groups formed at terminals of oligomers, in addition, converting the terminal fluorinated groups into useful terminal vinylidene groups which are highly reactive.

BACKGROUND ART

Butene oligomers having regular repeating structural units and vinylidene structures at their terminals of molecules are good in thermal decomposition property owing to the regularity of the repeating structural units and the uniformity in the distribution of terminal groups having a specific structure. Furthermore, they can react with maleic acid or the like in high yield. Polybutenyl succinic anhydride obtained by this reaction is further modified with amines into compounds, which are used industrially on a large scale because of their usefulness as additives for lubricant oils or fuel oils.

The useful butene oligomers as referred to in the foregoing passage are produced by polymerizing butenes such as isobutene in the presence of boron trifluoride catalyst (e.g., U.S. Pat. Nos. 4,152,499 and 4,605,808). Another method for producing butene polymers using aluminum chloride complex catalyst containing an organic nitro-compound as complexing agent is disclosed in U.S. Pat. No. 5,012,030.

However, among the butene oligomers produced through these methods, fluorine atoms, for example, derived from the boron trifluoride catalyst often remain as much as about 200 ppm (by weight). When the butene oligomers are converted into additives for lubricant oils or fuel oils or thus converted fuel oil additives are burned in running engines, the residual fluorine is decomposed into hydrogen fluoride, which may cause the corrosion of apparatus and the pollution of environment.

When polymerization is carried out using pure isobutene as a starting material and boron trifluoride as catalyst, it is possible to produce butene oligomer of the content of residual fluorine as low as 1 to 10 ppm as fluorine atom, by adjusting the molar ratio of boron trifluoride in catalyst and the complexing agent. However, the use of pure isobutene is costly and it is not advantageous in view of industrial practice. Moreover, it is necessary to carry out certain operations for dehalogenation in order to obtain a substantially halogen-free products.

On the other hand, when inexpensive butadiene raffinate can be obtained as a starting material in practical working, the formation of the residual fluorine originating from catalysts cannot be avoided, as long as boron trifluoride is used as catalyst. Furthermore, when a post-treatment is adopted for removing the residual fluorine, it causes a problem that the features of butene oligomer such as the regularity of the repeating structural units and the uniform presence of specific terminal groups are destroyed. By the way, when isobutene or butadiene raffinate is polymerized by using catalysts of aluminum chloride or its complex, chlorine sometimes remains and causes the same problem as in the case of boron trifluoride complex catalysts containing alcohols as complexing agents.

For example, in Japanese Laid-Open Publication No. S57-183726 (corresponding to U.S. Pat. No. 4,417,091), it is proposed that a butene fraction is polymerized into oligomer with a fluorine-containing nickel catalyst and the fluorine contained in the obtained olefin trimer is removed by the treatment with silica gel, for example. However, as shown in comparative examples later, in the case of polymers obtained by polymerizing $C_4$ fractions using boron trifluoride as catalyst, the treatment with silica gel cannot remove fluorine sufficiently.

As a further problem, it is sometimes noticed that double bonds in polymer are isomerized during the treatment so that the high content of terminal vinylidene group formed by polymerization is reduced. Incidentally, each isomerization (transfer) of carbon-carbon double bond in polymer is a kind of chemical reaction, and is sometimes accelerated with specific catalyst respectively.

The present inventors found out that they could accomplish dehalogenation while preventing double bonds from isomerizing by bringing polymers into contact with inorganic solid agent containing aluminum atoms.

As the result of further study by the present inventors, the following has become clear concerning the butene polymer that has been obtained according to the description of U.S. Pat. No. 4,605,808 mentioned above. When the butene polymer having a high content of terminal vinylidene structure and containing several ten to several hundred ppm of fluorine as organic fluorine impurity is brought into contact with alumna, isomerization of terminal vinylidene structure as a side reaction shown in the next formula is caused to occur remarkably as the treatment continues. After all, the content of terminal vinylidene structure is reduced by the treatment with alumina in a long period of operation.

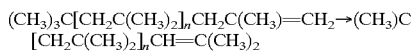

$(CH_3)_3C[CH_2C(CH_3)_2]_nCH_2C(CH_3)=CH_2 \rightarrow (CH_3)C[CH_2C(CH_3)_2]_nCH=C(CH_3)_2$ When butene polymers separately produced and containing no fluorine compound are treated with alumina, the above isomerization can be hardly recognized. Therefore, the phenomenon that the content of terminal vinylidene structure is reduced cannot be attributed to the effect by alumina itself of accelerating isomerization.

In the above example, the removal of fluorine compound contained in the butene polymer having a high content of terminal vinylidene structure is explained. However, as to unreacted $C_4$ fraction remaining after polymerization of butadiene raffinate with fluorine-containing catalyst, there is the same problem.

Because the above unreacted $C_4$ fraction is usually burned as a fuel intact or after 1-butene useful as a co-monomer for adjusting the density of high density polyethylene has been separated and removed, the concentration of the residual fluorine makes a problem for the same reason as in the case of butene polymer. In this case, dehalogenating treatment with an inorganic solid agent containing aluminum atoms is also useful and economic. However, 1-butene is likely to be isomerized to 2-butene in the similar manner to that shown in the above formula. When unreacted $C_4$ fraction in particular is used as a source of supply of 1-butene, it is important to suppress the isomerization of 1-butene to 2-butene.

When the present inventors investigated the above phenomenon of isomerization energetically, they have found out that fluorine fixed on alumina generates new acidic sites in addition to those inherent in alumina so that the isomerizability of alumina itself changes and the isomerization is accelerated.

In other words, it is supposed that fluorine atoms fixed on alumina form new strong Lewis acidic sites there, and the newly formed strong Lewis acidic sites accelerate the isomerization of non-conjugated carbon-carbon double bonds on the occasion of contact treatment for defluorination. The above-mentioned isomerizability increases with the total amount of the fluorine removed by defluorinating treatment, that is, the fluorine fixed on alumina by defluorinating treatment.

For example, in Japanese Patent Publication No. H06-28725 (corresponding to U.S. Pat. No. 5,288,849), it is proposed that olefins are refined with alumina compounds impregnated with alkali or alkali earth metals. That is, it is disclosed that the isomerization of olefins can be suppressed by impregnating alumina with alkali or alkaline earth metals.

However, by the method of adding alkali or alkaline earth metal proposed in the above patent, it is noticed that the ability of removing halogen such as fluorine rather decreases unfavorably. Moreover, there is a more important problem.

When the above-mentioned method proposed in Japanese Patent Publication No. H06-28725, wherein alumina is previously impregnated with a fixed amount of alkali metal or the like so as to keep the isomerizability low, the amount of alkali metal or the like is not sufficient to neutralize the strong acidic sites of Lewis acids which are newly generated by the treatment, even though defluorination is possible. As a result, isomerization of carbon-carbon double bonds begins to take place gradually according to the total amount of the fluorine removed in excess of a certain amount. However, when alumina is impregnated previously with a large excess of alkali or alkaline earth metals, the ability of removing halogen rather decreases owing to a bad effect caused by the excess of alkali.

As mentioned above, in the case of the alumina which is previously impregnated with alkali metal or the like as proposed in the above Japanese Patent Publication No. H06-28725, the removal of fluorine is insufficient, and moreover, the duration period is markedly short even though removal is possible, which is a fatal problem.

The object of the present invention, that is, the suppression of the isomerizability by alumina, is attained by neutralizing selectively the strong Lewis acidic sites which are newly generated by a treatment of defluorination to weaken or make harmless the isomerizability.

An aspect of the present invention is to provide a method of increasing the content of terminal vinylidene group rather than decreasing it and leaving no fluorine substantially, when highly reactive butene oligomers are produced with boron trifluoride type complex catalyst using commercially and cheaply available butadiene raffinate as a starting material.

Another aspect of the present invention is to provide a method of carrying out a contact treatment while suppressing the isomerization of the above carbon-carbon double bonds which is caused by the strong Lewis acidic sites newly generated during the process of defluorination, when organic compounds are brought into contact with an alumina-containing inorganic solid agent in order to reduce the concentration of residual fluorine in the organic compounds containing halogen compounds such as fluorine compound as impurity and having at least one non-conjugated carbon-carbon double bond in the structure.

A further aspect is to provide a method of reducing selectively the increased isomerizability of alumina, which still has the ability of defluorination, and reusing the alumina for the contact treatment,.

A still further aspect of the present invention is to provide the polybutene having the content of the terminal vinylidene structure maintained at 60% or more of the content before the treatment and having the fluorine remaining in a polymer reduced as far as practically harmless, by polymerizing a starting material of $C_4$ using boron trifluoride as a catalyst and feeding the obtained polymer having the high content of terminal vinylidene structure into a post-treatment step.

BRIEF DESCRIPTION OF DRAWINGS

FIG. 2 is a result of measurement by INADEQUATE method on butene polymer.

DISCLOSURE OF INVENTION

Figure 1:
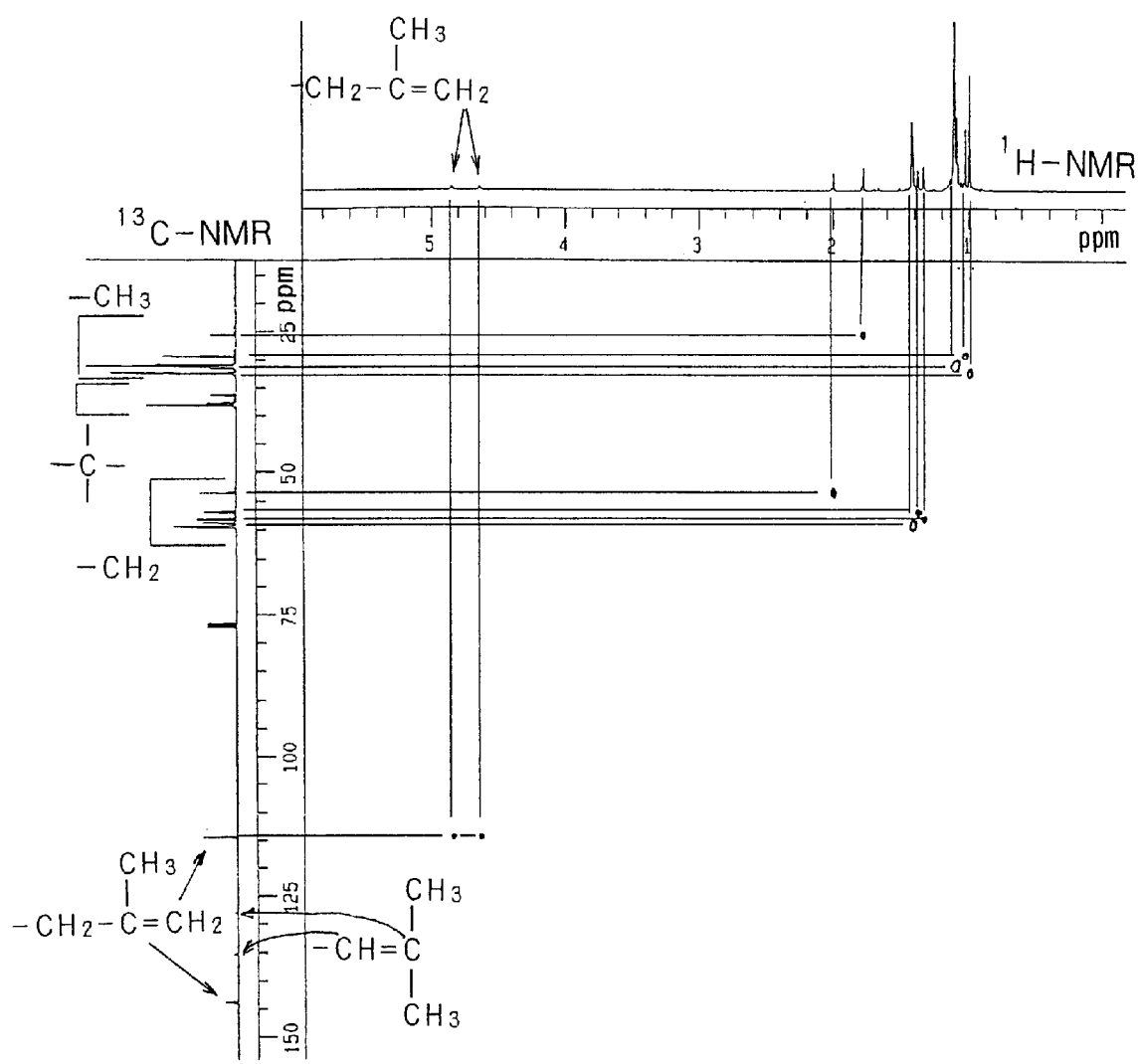
FIG. 1 is a result of measurement by HSQC method on butene polymer.

A first aspect of the present invention relates to a method for producing a butene polymer having a low fluorine content and a high terminal vinylidene content, which method comprises the steps (I) to (III) as follows:

step (I) to feed into a polymerization zone a starting material of $C_4$ components comprising less than 50% by mass of 1-butene, less than 50% by mass of 2-butene, less than 100% by mass of isobutene, less than 50% by mass of butenes and less than 10% by mass of butadiene; 0.1 to 500 mmole of boron trifluoride relative to 1 mole of isobutene contained in the above starting material; and 0.03 to 1,000 mmole of alcohols and/or dialkyl ethers as complexing agent relative to 1 mole of isobutene contained in the above starting material, and carrying out liquid-phase polymerization continuously at the polymerization temperature in the range of −100° C. to +50° C. and for the residence time in the range of 5 minutes to 4 hours, step (II) to deactivate the catalyst contained in the effluent reaction mixture from the polymerization zone, then subjecting the reaction mixture to distillation, if necessary, to obtain butene polymer containing residual fluorine of 1 ppm or more and terminal vinylidene of 60% or more.

step (III) to treat the butene polymer with an inorganic solid treating agent containing aluminum atoms so as to reduce the residual fluorine content in the above butene polymer while maintaining the terminal vinylidene content at 60% or more relative to the value before the treatment.

A second aspect of the present invention relates to a method for producing a butene polymer described in the first aspect, wherein the residual fluorine content in a polymer obtained in the above step (III) is 30 ppm or less.

A third aspect of the present invention relates to a method for producing a butene polymer described in the first aspect, wherein the content of terminal vinylidene structure in the polymer obtained in the above step (III) is 70% or more of the content before the treatment in step (III).

A fourth aspect of the present invention relates to a method for producing a butene polymer described in the first aspect, wherein the temperature of contact in the step (III) of the inorganic solid treating agent containing aluminum atoms with the butene polymer containing the residual fluorine is 0° C. or higher but 350° C. or lower, preferably 20° C. or higher but 300° C. or lower.

A fifth aspect of the present invention relates to a method for producing a butene polymer described in the first aspect, wherein the average contact time in the step (III) of the inorganic solid treating agent containing aluminum atoms with the butene polymer containing the residual fluorine is 1 minute or longer but 5 hours or shorter.

A sixth aspect of the present invention relates to a method for removing halogen as an impurity, which comprises the step of bringing an organic compound containing a halogen compound as an impurity and having one or more of non-conjugated carbon-carbon double bonds, into contact with an inorganic solid treating agent containing aluminum atoms to remove halogen, while maintaining in the reaction system the coexistence of a basic substance in an amount sufficient to suppress the isomerization of the above carbon-carbon double bonds of the organic compound.

A seventh aspect of the present invention relates to a method for removing halogen as an impurity described in the sixth aspect, wherein the inorganic solid treating agent contains a component represented by the chemical formula: $Al_2O_3$.

An eighth aspect of the present invention relates to a method for removing halogen as an impurity described in the seventh aspect, wherein the inorganic solid treating agent is alumina.

A ninth aspect of the present invention relates to a method for removing halogen as an impurity described in the sixth aspect, wherein the halogen compound is a fluorine compound.

A tenth aspect of the present invention relates to a method for removing halogen as an impurity described in the sixth aspect, wherein the basic substance is ammonia or organic amines.

An eleventh aspect of the present invention relates to a method for removing halogen as an impurity described in the sixth aspect, wherein the temperature of contact of the inorganic solid treating agent with the organic compound is 0° C. or higher but 350° C. or lower, preferably 20° C. or higher but 300° C. or lower.

A twelfth aspect of the present invention relates to a method for removing halogen as an impurity, which comprises the step of bringing an organic compound containing a halogen compound as an impurity and having one or more non-conjugated carbon-carbon double bonds, into continuous contact with an inorganic solid treating agent containing aluminum atoms to remove halogen, while feeding a basic substance into the organic compound continuously or intermittently in the amount sufficient to suppress the isomerization of the above carbon-carbon double bonds in the organic compound.

A thirteenth aspect of the present invention relates to a method for removing halogen as an impurity, which comprises the step of bringing butene polymer of a high terminal vinylidene content that is produced by polymerizing isobutene using a halogen-containing catalyst, into contact with an inorganic solid treating agent containing aluminum atoms, thereby removing halogen, while maintaining the coexistence of a basic substance in the amount sufficient to suppress the isomerization of the terminal vinylidene group in the butene polymer.

A fourteenth aspect of the present invention relates to a method for removing halogen as an impurity, which comprises the step of bringing butene polymer of a high terminal vinylidene content that is produced by polymerizing isobutene using a halogen-containing catalyst, into continuous contact with an inorganic solid treating agent containing aluminum atoms, thereby removing halogen, while feeding a basic substance into the butene polymer continuously or intermittently in the amount sufficient to suppress the isomerization of the terminal vinylidene group.

A fifteenth aspect of the present invention relates to a method for removing halogen as an impurity described in any of thirteenth or fourteenth aspect, wherein the isobutene is a starting material of $C_4$ components containing less than 50% by mass of 1-butene, less than 50% by mass of 2-butene, less than 100% by mass of 1-butene, less 50% by mass of butanes and less than 10% by mass of butadiene.

A sixteenth aspect of the present invention relates to a method for producing butene polymer, which comprises the step of bringing butene polymer containing 1 ppm or more of residual halogen and 60% or more of terminal vinylidene group into contact with an inorganic solid treating agent containing aluminum atoms to remove halogen, while maintaining, in the reaction system, the coexistence of a basic substance in the amount sufficient to suppress the isomerization of the terminal vinylidene group, thereby obtaining butene polymer containing 40 ppm or less of residual halogen and the content of terminal vinylidene group of 60% or more relative to the value before treatment.

A seventeenth aspect of the present invention relates to a method for producing a butene polymer described in the sixteenth aspect, wherein the residual halogen content of butene polymer after the treatment is 30 ppm or less.

An eighteenth aspect of the present invention relates to a method for producing a butene polymer described in the sixteenth aspect, wherein the content of terminal vinylidene group of butene polymer is maintained at 70% or more relative to the value before treatment.

A nineteenth aspect of the present invention relates to a method for removing halogen as an impurity, which comprises the step of bringing monoolefin containing a halogen compound as an impurity into contact with an inorganic solid treating agent containing aluminum atoms to remove halogen, while maintaining, in the reaction system, the coexistence of a basic substance in the amount sufficient to suppress the isomerization of carbon-carbon double bonds of the monoolefin.

A twentieth aspect of the present invention relates to a method for removing halogen as an impurity, which comprises the step of bringing a monoolefin containing a halogen compound as an impurity into continuous contact with an inorganic solid treating agent containing aluminum atoms to remove halogen, while feeding a basic substance into the monoolefin continuously or intermittently in an amount sufficient to suppress the isomerization of carbon-carbon double bonds of the monoolefin.

A twenty-first aspect of the present invention relates to a method for removing halogen as an impurity described in any of nineteenth or twentieth aspect, wherein the monoolefin containing a halogen compound as an impurity is the one which was subjected to catalytic action with a halogen-containing catalyst.

A twenty-second aspect of the present invention relates to a method for removing halogen as an impurity described in the twenty-first aspect, wherein the monoolefin which was subjected to catalytic action with a halogen-containing catalyst is a residual unreacted $C_4$ fraction obtained from the production of butene polymer with a halogen-containing catalyst using a $C_4$ starting material.

A twenty-third aspect of the present invention relates to a method for regenerating an inorganic solid treating agent containing aluminum, which comprises the step of bringing an inorganic solid treating agent containing aluminum atoms having an increased ability of isomerizing non-conjugated carbon-carbon double bonds as the result of fixing halogen, into contact with a basic substance, thereby reducing the isomerizing ability of the above treating agent.

A twenty-fourth aspect of the present invention relates to a method for regenerating an inorganic solid treating agent containing aluminum described in the twenty-third aspect, wherein the inorganic solid treating agent contains a component represented by the chemical formula: $Al_2O_3$.

A twenty-fifth aspect of the present invention relates to a method for regenerating an inorganic solid treating agent containing aluminum described in the twenty-fourth aspect, wherein the inorganic solid treating agent is alumina.

A twenty-sixth aspect of the present invention relates to a method for producing a highly reactive butene oligomer, which comprises the treatment to remove hydrogen fluoride by causing the butene oligomer to contact with an inorganic solid treating agent, the butene oligomer containing 80% by mole or more of repeating structural units as represented by the following formula [1], 60% by mole or more of molecules having terminal vinylidene groups on one side as represented by the following formula [2] and 0.005 to 15% by mole of molecules having fluorinated terminal groups as represented by the following formula [3], thereby converting the fluorinated terminal groups of the formula [3] into the terminal vinylidene groups of the formula [2].

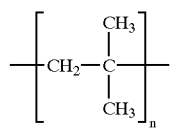

[1]

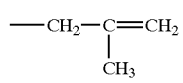

[2]

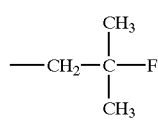

[3]

(wherein, n represents an integer of 0 or more, preferably 5 or more, and more preferably from 16 to 200.)

A twenty-seventh aspect of the present invention relates to a method for producing a highly reactive butene oligomer, wherein the inorganic solid treating agent contains aluminum atoms.

A twenty-eighth aspect of the present invention relates to a method for producing a highly reactive butene oligomer described in the twenty-sixth aspect, which comprises the step of decreasing the amount of molecules having the fluorinated terminal group to 0.05% by mole or less, preferably to 0.005% by mole or less by treating with the inorganic solid treating agent.

A twenty-ninth aspect of the present invention relates to a method for producing a highly reactive butene oligomer described in the twenty-sixth aspect, wherein the contact temperature of treating the butene oligomer with the inorganic solid treating agent is in the range of 0 to 350° C., preferably 20 to 300° C.

A thirtieth aspect of the present invention relates to a method for producing a highly reactive butene oligomer described in the twenty-sixth aspect, wherein the average contact time in treating the butene oligomer with the inorganic solid treating agent is 1 minute or more but less than 5 hours.

A thirty-first aspect of the present invention relates to a method for producing a highly reactive butene oligomer, which comprises the Steps (I) to (IV) to obtain the butene oligomer containing 80% by mole or more of repeating structural units as represented by the following formula [1] and 60% by mole or more of molecules having terminal vinylidene groups on one side as represented by the following formula [2],

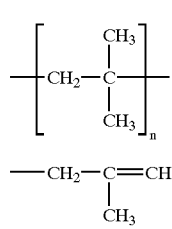

[1]

[2]

(wherein, n represents an integer of 0 or more, preferably 5 or more, and more preferably from 16 to 200.)

Step (I) to carry out liquid-phase polymerization of olefin in the presence of a boron trifluoride complex catalyst comprising boron trifluoride and a complexing agent, Step (II) to deactivate the residual boron trifluoride complex catalyst in a reaction mixture after the polymerization, Step (III) to obtain the butene oligomer which contains 80% by mole or more of repeating structural units as represented by the above formula [1], 60% by mole or more of molecules having terminal vinylidene groups on one side as represented by the above formula [2] and 0.005 to 15% by mole of molecules having fluorinated terminal groups as represented by the following formula [3].

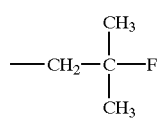

[3]

Step (IV) to treat the oligomer obtained in the above Step (III) with an inorganic solid treating agent to carry out the reaction to remove hydrogen fluoride, thereby converting fluorinated terminal groups as represented by the formula [3] into terminal vinylidene groups as represented by the formula [2].

A thirty-second aspect of the present invention relates to a method for producing a highly reactive butene oligomer described in the thirty-first aspect, wherein the olefin content in a starting material for the liquid-phase polymerization of the Step (I) is at least 5% by mass.

A thirty-third aspect of the present invention relates to a method for producing a highly reactive butene oligomer described in the thirty-first aspect, wherein the complexing agent forming a complex with boron trifluoride in the Step (I) is selected from the group consisting of water, alcohols, ethers, phenols, ketones, aldehydes, esters, organic acids and acid anhydrides.

A thirty-fourth aspect of the present invention relates to a method for producing a highly reactive butene oligomer described in the thirty-first aspect, wherein the molar ratio of boron trifluoride to a complexing agent in a boron trifluoride complex catalyst used in the Step (I) is in the range of 0.01:1 to 2:1.

A thirty-fifth aspect of the present invention relates to a method for producing a highly reactive butene oligomer described in the thirty-first aspect, wherein the inorganic solid treating agent used in the Step (IV) contains aluminum atoms.

A thirty-sixth aspect of the present invention relates to a method for producing a highly reactive butene oligomer described in the thirty-first aspect, which comprises the step of treating the oligomer obtained in Step (III) with the inorganic solid treating agent in the Step (IV), thereby decreasing the amount of molecules having the fluorinated terminal groups as represented by the formula [3] to 0.05% by mole or less, preferably to 0.005% by mole or less.

A thirty-seventh aspect of the present invention relates to a method for producing a highly reactive butene oligomer described in the thirty-first aspect, wherein the temperature in the contact treatment of the oligomer obtained in Step (III) with the inorganic solid treating agent in the Step (IV) is in the range of 0 to 300° C., preferably 20 to 300° C.

A thirty-eighth aspect of the present invention relates to a method for producing a highly reactive butene oligomer described in the thirty-first aspect, wherein the average contact time in the treatment of the oligomer obtained in Step (III) with the inorganic solid treating agent in the Step (IV) is 1 minute or more but less than 5 hours.

In the following, the present invention will be described in more detail.

In the present inventions such as the sixth, the twelfth and the twenty-third aspects, the organic compounds to be treated have one or more non-conjugated carbon-carbon double bonds which can be isomerized in each molecule, and further, contain halogen compounds such as fluorine compound and chlorine compound as impurities which can be adsorbed by inorganic solid agents containing aluminum atoms such as alumina. The above organic compounds can have hetero-atoms such as oxygen and phosphorus, or various functional groups such as aromatic ring in molecules, as long as they are inactive to the inorganic solid agents such as alumina.

Further, the organic compounds are not particularly limited in molecular weight, and they can include $C_4$ olefins such as butene as the lower limit of molecular weight and olefins from oligomer zone such as dimers to polymers as the compounds of high molecular weight. Specifically, organic compounds having the molecular weight up to several hundred thousand can be used as the compounds of high molecular weight.

The above organic compounds have non-conjugated carbon-carbon double bonds, and can also contain double bonds of aromatic ring or conjugated double bonds, as long as they do not influence the treatment. Further, two or more non-conjugated double bonds can be contained in one molecule, as long as they can be isomerized.

As examples of the above organic compounds, there are unsaturated hydrocarbons having at least one non-conjugated double bond that can be isomerized. Exemplified as the olefinic compounds are monoolefins having low molecular weight such as 1-butene, 2-methyl-1-butene, 3-methyl-1-butene, 1-pentene, 1-hexene, vinylcyclohexane, 4-methyl-1-pentene, 2,4,4-trimethyl-1-pentene, 1-decene. Further, olefin oligomers having vinylidene structure at the terminal position such as polyisobutene can be also used, which oligomer can be obtained by polymerizing olefins such as isobutene as monomer. In other words, as to molecular weight, the wide range can be used, which includes $C_4$ olefin zone of low molecular weight, oligomer zone of several thousand in molecular weight, and further polymer zone of several hundred thousand.

When the olefinic compounds are highly viscous liquids, it is preferable to dilute the liquids with inert solvents in order to improve the contact efficiency with the inorganic solid agent containing aluminum atoms such as alumina. Exemplified as the inert solvents are aliphatic hydrocarbon solvents such as n-hexane and isohexane. Further, a light polymer described later can be used, as long as the viscosity is appropriate.

Although the halogen compounds contained as impurities in the above organic compounds are mostly those which originate from halogen-containing catalysts used for producing the organic compounds, they contain sometimes also halogen compounds originating from the impurities other than catalysts in the starting materials.

As fluorine compounds, there are inorganic fluorine compound, organic fluorine compound and mixtures thereof, for example, inorganic fluorine compounds such as hydrogen fluoride, boron trifluoride and silicon tetrafluoride, and organic fluorine compounds such as 2-fluoro-2,4,4-trimethylpentane. However, they are not limited particularly to the above.

When the halogen is chlorine, there are inorganic chlorine compound, organic chlorine compound and mixtures thereof, for example, inorganic chlorine compounds such as hydrogen chloride and aluminum chloride, and organic chlorine compounds such as 2-chloro-2,4,4-trimethylpentane.

Further, it is also possible to use fluorinated hydrocarbons having high molecular weight, for example, the hydrocarbons which are produced as by-products when polymerizing olefins using fluorine-containing catalysts and have the molecular weight corresponding to monomer, or dimer or more. These halogen compounds such as fluorine compound are usually comparatively low in content. and the boiling points are close to those of the above organic compounds. Therefore, they are hardly separated and removed with conventional separating means such as distillation.

Though the content of halogen compound is not limited particularly, it is generally at most several thousand ppm as halogen atom, and can be over ten mass % depending on the situation. Because all halogen compounds are, as it were, impurities in organic compounds as main component, they must be removed as described above. The halogen compound in the content of ppm-level is usually too small to remove. However, the method of the present invention is also applied to the case of such a low halogen content advantageously.

As the olefin oligomers among the organic compounds used in the present invention, butene polymers having the terminal vinylidene structure obtained by polymerizing $C_4$ fractions using fluorine-containing catalysts are exemplified as described above. This butene polymer contains several ppm or more, usually 10 to several thousand ppm of fluorine atom as impurity, and the fluorine is supposed to be in the form of organic fluorine compound, definitely fluorinated hydrocarbon. Further, the butene polymer that is produced using the aluminum chloride complex catalyst as described in the above U.S. Pat. No. 5,012,030 can be also used, which catalyst contains an organic nitro-compound as complexing agent. This butene polymer contains usually 10 to several thousand ppm of chlorine atom as impurity similarly, and the chlorine is supposed to be in the form of organic chlorine compound, definitely chlorinated hydrocarbon.

Moreover, the unreacted $C_4$ fraction remaining after the polymerization of $C_4$ fraction can be also treated for defluorination according to the present invention, because it contains fluorine compound or chlorine compound as impurity. The fluorine or chlorine in this case is also supposed to be in the form of organic halogen compound.

In the following, the production of the above butene polymer will be explained, wherein boron trifluoride complex type catalyst is used.

Butene polymer is produced by polymerizing continuously isobutene or a starting material of $C_4$ containing isobutene in a polymerization zone (reaction zone). As continuously operating reactors, any type that can carry out appropriate heat removal and stirring can be used, such as stirring-type reactor and loop-type reactor. The unreacted components, the butene polymer product and the reaction liquid containing catalyst flow out from the polymerization zone.

As a typical starting material of $C_4$, there is the fraction (butadiene raffinate) which is left after extracting butadiene from $C_4$ fraction flowing out from a cracker of thermal cracking or of fluidized catalytic cracking (FCC), both of which carry out cracking of hydrocarbons such as naphtha, kerosene, gas oil and butane to produce lower olefins such as ethylene and propylene. In any case, the starting material is characterized in that it contains n-butenes as well as isobutene as olefins. The above fraction is the most general as a starting material for butene oligomer, and is economical. However, it is hard particularly to obtain a butene polymer that does not contain halogen using the above starting material. Accordingly, the present invention exhibits the effect most strikingly at this point.

Specifically, a starting material of $C_4$ comprises less than 50 mass % of 1-butene, less than 50 mass % of 2-butene, less than 100 mass % of isobutene , less than 50 mass % of butanes and less than 10 mass % of butadiene (total: 100 mass %). When a starting material of $C_4$ hydrocarbon containing certain amounts of 1-butene and 2-butene in addition to isobutene is polymerized using a catalyst, for example, boron trifluoride complex catalyst, a considerable proportion of fluorine atoms is inevitably mixed into the polymer product in many cases.

The typical composition of $C_4$ fraction as a starting material of $C_4$ contains unsaturated components comprising about 1 to 40 mass %, preferably about 10 to 40 mass % of 1-butene, about 1 to 40 mass % of 2-butene, about 10 to 80 mass %, preferably about 40 to 70 mass % of isobutene, and about less than 10 mass %, preferably about 0.5 mass % or less of butadiene, and saturated component comprising about 10 to 30 mass % of butanes (total of $C_4$ fraction: 100 mass %). The composition is not limited as long as it is in the above range, and the $C_4$ fraction containing isobutene which is contained in a decomposition product of cracking from a FCC as described above as well as a thermal cracker can be used.

Further, the fraction having the composition modified by appropriate means can be used as long as the composition is in the above range. Definitely, the composition can be modified by distillation, by adding isobutene to increase the concentration of isobutene, by subjecting isobutene to oligomerization by a slight polymerization to reduce the concentration of isobutene, by carrying out a reaction such as catalytic hydroisomerizaztion to reduce the concentration of 1-butene, or by altering the composition through various physical and chemical operations.

The larger the isobutene content is, the more favorable the $C_4$ fraction is. However, in a butadiene raffinate, for example, the isobutene content is at most 70 mass % or so. The $C_4$ fraction from FCC or the like is usually still lower in isobutene content.

As catalysts for the polymerization of isobutene, fluorine-containing catalysts are used preferably. When fluorine-containing catalysts are used, fluorine compounds get mixed in the product of butene polymer as impurity. Aluminum chloride or its complex catalyst can be used, then chlorine compounds get mixed as impurity.

As to fluorine-containing catalysts, the kind is not limited as long as fluorine as impurity is mixed in a product during the use. Definitely, besides boron trifluoride type catalyst, there is a catalyst obtained by bringing a bivalent nickel compound into contact with halogenized hydrocarbyl aluminum and trifluoroacetic acid, such as the catalyst formed by interaction of nickel heptanoate, and dicholoroethylaluminum and trifluoroacetic acid. The bivalent nickel-type fluorine-containing catalyst is proposed in Japanese Laid-Open Patent Publication No. S57-183726 (corresponding to U.S. Pat. No. 4,417,091).

Preferable fluorine-containing catalysts are those of boron trifluoride type. These catalysts are fed into a polymerization zone in the rate of 0.1 to 500 mmole of boron trifluoride relative to 1 mole of isobutene as a starting material. The adjustment of the molecular weight of butene polymer obtained according to the present invention can be carried out by controlling the reaction temperature and the amount of catalyst. If the amount of boron trifluoride as catalyst is less than this range, the reaction is difficult to proceed. On the other hand, if it is more than this range, the molecular weight of butene polymer becomes lower and the catalyst cost increases as well, which are both unfavorable.

Further preferable boron trifluoride type catalysts are those containing oxygen-containing compounds as complexing agents. Exemplified as oxygen-containing compounds which can form catalysts with boron trifluoride are water, alcohols, ethers such as dialkyl ethers. Water, alcohols, dialkyl ethers or mixtures thereof can be fed into a polymerization zone in the ratio of 0.03 to 1,000 mmole of the total amount of complexing agents relative to 1 mole of isobutene in the stating material. If the amount of complexing agents is more than this range, the reaction is difficult to proceed. On the other hand, if it is less than this range, side reactions are caused to occur in a large amount, which are both unfavorable.

All of the above-mentioned water, alcohols and dialkyl ethers form complexes together with boron trifluoride in a reaction system. Therefore, the method may be adopted, which comprises preparing a complex comprising a complexing agent such as water, alcohols, dialkyl ethers or mixtures thereof and boron trifluoride beforehand separately outside a polymerization zone, and feeding it into a reaction system. Further, the method can be adopted as another mode of polymerization according to the present invention, which method comprises feeding boron trifluoride and the above complexing agent into a polymerization zone separately and causing them to form a complex in the polymerization zone. In the case of feeding boron trifluoride and a complexing agent separately into a polymerization system, the amount ratios of complex components such as boron trifluoride, water, alcohols and dialkyl ethers relative to a starting material of $C_4$ hydrocarbon can be set in the same range as described above.

In order to produce a butene polymer having stable properties while keeping up promptly with the change of concentration of water or isobutene in feed stock, it is advantageous to adjust the amount of boron trifluoride and its molar ratio relative to a complexing agent keeping up with the above changes quickly. For this purpose, it is more favorable to feed water, alcohols, dialkyl ethers or a mixture thereof separately from boron trifluoride into a reaction zone as described above.

Specific alcohols and dialkyl ethers as complexing agents are as follows.

As examples of alcohols, there are aromatic or $C_1$ to $C_{20}$ aliphatic alcohols such as methanol, ethanol, propanol, butanol, pentanol, hexanol, heptanol, octanol, nonanol, decanol, and benzyl alcohol, cyclohexanol and 1,4- butanediol. The carbon skeleton of the above $C_1$ to $C_{20}$ aliphatic alcohols is not limited on degree of branching, and may be linear alkyl group, sec- or tert-branched alkyl group and alicyclic alkyl group, or alkyl group containing rings. These alcohols can be used singly or as a mixture of appropriate ratio.

As examples of alkyl diethers, there are aromatic or $C_1$ to $C_{20}$ aliphatic alkyl diethers having a single kind or different kinds of hydrocarbon groups, such as dimethyl ether, diethyl ether, methyl ethyl ether, dipropyl ether, methyl propyl ether, ethyl propyl ether, dibutyl ether, methyl butyl ether, ethyl butyl ether, propyl butyl ether, dipentyl ether, and phenyl methyl ether, phenyl ethyl ether, diphenyl ether, cyclohexyl methyl ether and cyclohexyl ethyl ether. The skeletons of the above $C_1$ to $C_{20}$ hydrocarbon is not limited on degree of branching, and may be linear alkyl group, sec- or tert-branched alkyl group and alicyclic alkyl group, or alkyl group containing rings. These dialkyl ethers can be used singly or as a mixture of appropriate ratio.

As to complexing agents such as water and the above alcohols and dialkyl ethers, more than one kind thereof can be also used as a mixture of appropriate ratio.

Polymerization with boron trifluoride type catalyst is carried out in a liquid-phase, the polymerization temperature is in the range of −100° C. to +50° C., preferably −50° C. to +20° C. If the temperature is lower than this range, the polymerization rate of isobutene is suppressed. On the other hand, if the temperature is higher than this range, side reactions such as isomerization and rearrangement are caused to occur, and it is difficult to obtain the intended product of the present invention.

As to the type of polymerization, any of batch system or continuous system can produce butene polymers having a high content of terminal vinylidene structure. However, from the viewpoint of industrial production, a continuous method is more economical and effective, therefore, an example of continuous polymerization will be explained.

Generally, in the case of continuous system, the contact time of a starting material and a catalyst is important. In the polymerization according to the present invention, the contact time is preferably in the range of 5 minutes to 4 hours. If the contact time is shorter than 5 minutes, sufficient conversion rate of isobutene cannot be obtained, and further, excessive equipment is required for removing the reaction heat. On the other hand, if the contact time is longer than 4 hours, economical loss increases, and further, side reaction such as isomerization and rearrangement of the produced butene polymer can be accelerated. Therefore, both cases are unfavorable.

After polymerization, a reaction fluid containing unreacted components, the produced butene polymer and the catalyst flows out from a polymerization zone as described above.

In the next step, the above reaction liquid is subjected to deactivation of catalysts using an appropriate deactivating agent such as water, alkaline water and alcohol according to the conventional method.

After the deactivation of catalyst, neutralization and water washing are carried out if necessary to remove the residue of catalysts, then appropriate distillation removes unreacted components to give a butene polymer. The butene polymer obtained as above can be divided into a lighter fraction (hereinafter, sometimes referred to as "light polymer") and a heavier fraction by further appropriate distillations.

As mentioned above, a butene polymer containing the terminal vinylidene group in the ratio as high as 60% by mole or more relative to total terminal groups can be obtained by carrying out a liquid-phase polymerization of isobutene using boron trifluoride as a polymerization catalyst and water, alcohol, dialkyl ether or the like as a complexing agent. However, the butene polymer contains 1 ppm or more of fluorine atom as the residual fluorine, which is usually 5 ppm or more and a maximum of several hundred ppm depending on the situation. The residual fluorine is an organic fluorine which cannot be removed even by carrying out the conventional deactivation and the following water washing.

The molecular skeleton of the above butene oligomer, and the structure and the content of olefins at the terminal group are measured according to the method described in a former patent application by the present inventors (Japanese Laid-Open Patent Publication No. H10-76708).

As to the molecular skeleton of butene oligomer, the analytical technology by NMR has made a great progress in recent years, so that a measuring method has been developed, which can give information concerning the connection of carbon skeleton in organic high molecular compounds. This method is the one using a two-dimensional spectrum and can determine the connection of carbon-hydrogen and that of carbon-carbon, which includes HSQC ($^1$H Detected Single Quantum Coherence) method and INADEQUATE (Incredible Natural Abundance Double Quantum Transfer Experiment) method.

As to the butene oligomer obtained according to the present invention, FIG. 1 shows an example of the result by HSQC method, and FIG. 2 shows an example of the result by INADEQUATE method.

In HSQC method, taking chemical shift of $^1$H-NMR as abscissa and chemical shift of $^{13}$C-NMR as ordinate, the crossing point of a peak of $^1$H-NMR and a peak of $^{13}$C-NMR indicates that a carbon and a hydrogen corresponding to each peak are connected together, by which the connection of carbon-hydrogen in a molecule can be known.

Further, in INADEQUATE method, taking the chemical shift of $^{13}$C-NMR as abscissa and the frequency of carbon as ordinate, the frequency of carbon corresponding to a peak on the abscissa is found on a vertical line. When a straight line is drawn from that position parallel to abscissa, the peak of carbon corresponding to a point on the line is the carbon connected with the former carbon. When similar procedures are repeated and the carbons are arranged one after another, the connection between carbon-carbon in a molecule, that is, carbon skeleton can be known.

From the measurements of HSQC method and INADEQUATE method, it was found out that 80% or more of the repeating structural units of butene oligomers according to the present invention are composed of the structure as represented by the following formula [1]. One side of terminal groups is usually tert-butyl group. The number of n of repeating structural units as represented by the formula [1] is 0 or more, preferably 5 or more, further preferably 16 or re, and the upper limit is 200.

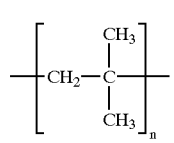

[1]

As mentioned above, 80% or more of all repeating structural units of the molecules of butene oligomer obtained according to the present invention are composed of completely linear molecules, which structure is useful as raw materials for an additive of lubricants and for an improver of fuel detergent.

The butene oligomer having the polymer structure connected by isobutene skeleton regularly has the number average molecular weight (Mn) in the range of 500–15,000. Further, it is obvious that it has a narrow molecular weight distribution, because the value of dispersion degree (Mw/Mn) is in the range of 1.0–2.5 according to the measurement by a gel permeation chromatography (GPC). Since the molecular weight distribution is narrow as above, it is possible to obtain the product having a fixed viscosity.

In the following, the kinds of olefin structures and their contents in the terminal group will be described.

In the butene oligomer according to the present invention, it has been found out that there are various isomers of double bond in accordance with a polymerization mechanism proposed by Puskas et al., J. Polymer Sci., Symposium No. 56, 191–202 (1976). In improving the properties of additives for lubricant and so forth, the olefin structure of the terminal group of butene oligomer is important.

A pair of olefin carbons in butene oligomer is detected at each inherent chemical shift in the range of about 110–150 ppm. As shown in FIG. 1, the olefin carbons of vinylidene structure represented by the following formula [2] correspond to the peaks at 114.4 ppm and 143.3 ppm, and the olefin carbons of tri-substituted structure as represented by the following formula [4] correspond to the peaks at 127.7 ppm and 135.4 ppm. Further, the amount ratio of each type of double bond connection can be expressed by the ratio of the area of each detected peak.

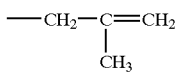

[2]

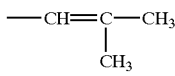

[4]

The butene oligomer according to the present invention contains 60% by mole or more of molecules having the terminal vinylidene structure, preferably 80% by mole or more. Because the butene oligomer according to the present invention contains such a large amount of the terminal vinylidene group, when it is used as a starting material for modification by adding maleic acid or hydroformylating, the modification rate is high. For example, polybutenyl succinic acid can be produced in high yield by a reaction of adding maleic acid.

However, here is a problem, that is, the terminal group of butene oligomer does not consist only of double bonds such as vinylidene group, but the terminal group having the fluorinated terminal group structure as represented by the following formula [3] is also produced as a by-product.

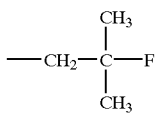

[3]

Up to now, it has been well known that about 200 ppm of fluorine atoms originating in boron trifluoride catalyst remain in butene oligomer. In this case, the fluorine content is obtained by analyzing the product of butene polymer by the method of Wickbold combustion (JIS K-2541) and colorimetry on fluorine (JIS K-0101.31) and calculating the weight of contained fluorine atoms relative to the total weight of the sample. Therefore, it was not clear formerly whether the fluorine atoms originated in inorganic fluorine or organic fluorine compound. However, the adopted method comprises deactivating a reaction liquid containing unreacted components flowing out from a polymerization zone, the produced butene polymer and boron trifluoride type complex catalysts using a basic substance such as an aqueous solution of sodium hydroxide, and removing fluorine compound by water washing. Therefore, it was supposed that the residual fluorine does not originate in inorganic fluorine compounds, but originates in organic fluorine compounds formed in the manner that fluorine atoms originating in boron trifluoride catalyst are isolated and taken into butene oligomer.

The present inventors succeeded in isolating the above fluorine compound by a silica-chromatography widely used in laboratories. As a result, it has been made clear that fluorine atoms isolated by decomposition of boron trifluoride are combined with butene oligomers to form organic fluorine compounds.

Further, when the isolated organic fluorine compound was analyzed by NMR as will be mentioned later, it was found out that 80% or more in number of repeating structural units of oligomer has the structure as represented by the formula [1], and one side of terminal groups has terminal tertiary fluoride as represented by the following formula [3].

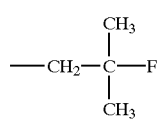

[3]

Further, as the result of GPC analysis, the molecular weight distribution of this fluoride was confirmed to be the same as that of the butene oligomer having olefin terminals such as vinylidene group.

Accordingly, the number of moles of butene oligomer fluorinated at the terminal in a product can be calculated according to the following procedure.

At first, the concentration (usually in ppm) of the contained fluorine atoms is obtained by the above-mentioned Wickbold combustion-colorimetry on fluorine, then the weight of butene oligomer fluorinated at the terminal in a product is obtained using the product of the above calculated value multiplied with the average molecular weight of butene oligomer. Then, because the butene oligomer fluorinated at the terminal can be considered to have the same molecular weight as that of the butene oligomer having other terminal group, the number of molecules of the butene oligomer fluorinated at the terminal can be calculated by dividing the weight of the butene oligomer fluorinated at the terminal by the average molecular weight of the product.

As a result of the above, it was found out that there are butene oligomers fluorinated at the terminals in the range of 0.005–15% by mole of the butene oligomer fluorinated at the terminal cannot be ignored in using the product of butene oligomer directly or as additives for lubricant or fuel oil in engines, which deteriorates the value of product.

At this point, there is a problem how the butene oligomer fluorinated at the terminal is formed. Thus, the present inventors carried out the following analysis on the form of boron trifluoride in a reaction fluid, which contains boron trifluoride type complex catalysts flowing out from a polymerization zone. As a result, it was found out that the form of $BF_3$ before polymerization is altered into $BF_2$ with one fluorine atom removed. From this fact and the above-mentioned result concerning the determination of the structure of the butene oligomer fluorinated at the terminal, the mechanism of formation of the butene oligomer fluorinated at the terminal can be proposed.

In estimating the manner of alteration of the form of boron trifluoride, the following analytical device well known in the industry concerned was used.

For example, when boron trifluoride or its complex is caused to react with an aqueous solution of calcium chloride, 3 mole of hydrogen chloride and 1 mole of boric acid are formed from 1 mole of boron trifluoride according to the following reaction formula.

$$2BF_3 + 3CaCl_2 + H_2O \rightarrow 2H_3BO_3 + 6HCl + 3CaF_2$$

The concentration of fluorine in the solution can be known by titrating the formed hydrogen chloride with an aqueous alkaline solution having a known normality such as sodium hydroxide or potassium hydroxide.

Further, the concentration of boron in the solution can be known by titrating the boric acid formed according to the above reaction formula by the method for measuring the content of boric acid in accordance with JIS K8863-1991. That is, the above method takes advantage of the fact that boric acid forms a water soluble complex having strong acidity with mannitol. The boric acid content can be known by titrating the formed complex having strong acidity with an aqueous alkaline solution having a known normality, then the concentration of boron is obtained from the boric acid content.

The practical technique for estimation on boron trifluoride used in the present invention is as follows. First, a polymerization liquid containing boron trifluoride type complex catalysts is withdrawn directly, and the liquid is subjected to absorption in an aqueous solution of calcium chloride in a closed vessel. Then, the above-mentioned two step titration is carried out on the water phase of the absorption liquid to determine the contents of fluorine and boron and obtain the composition ratio of both the atoms. As a result, as to the form of boron trifluoride in a reaction liquid obtained according to the present invention, the atomic ratio of fluorine and boron is [3—(number of moles of produced fluorinated butene oligomer)/(number of moles of $BF_3$ fed in a reaction zone)]: 1 in all cases, which means that a catalyst having the form of $BF_3$ before polymerization has changed into the one having the form of $BF_2$ by the same number of moles as that of the produced fluorinated butene oligomer. By the way, in the above, the number of moles of the produced fluorinated butene oligomer was obtained by the above-mentioned Wickbold combustion-colorimetry on fluorine.

In the above polymerization of a starting material of butadiene raffinate using boron trifluoride type complex catalysts, the alteration in the form of boron trifluoride and the accompanying formation of the butene oligomer fluorinated at the terminal can be explained according to the following formation mechanism.

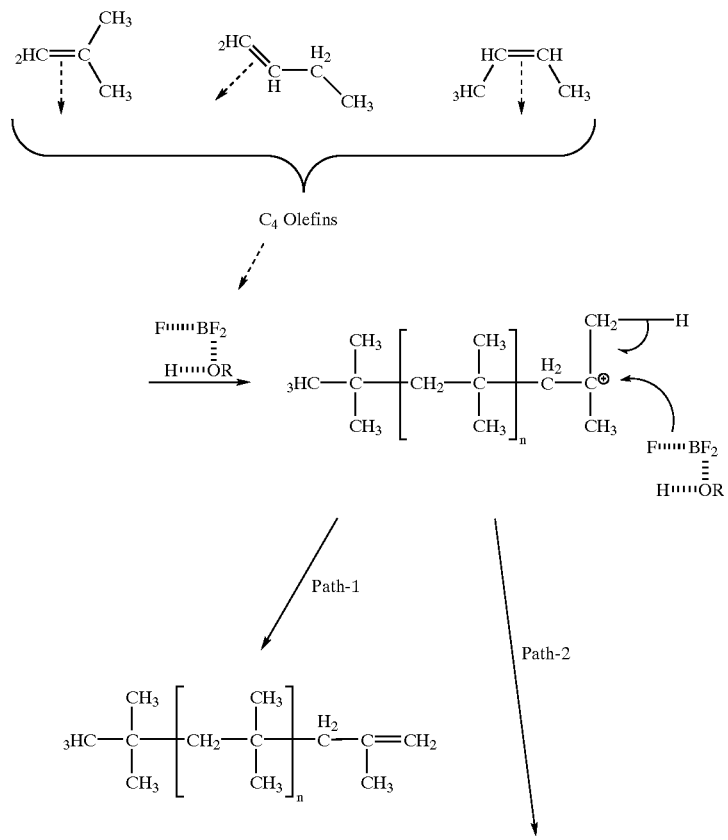

-continued

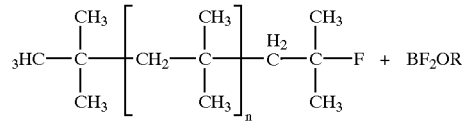

In the above formation mechanism, the growth of butene oligomer by polymerization proceeds by coordination of the $BF_3$ type complex catalyst to the olefins in a starting material of butadiene raffinate. Then, because the butene oligomer cations generated by the growth of polymer are chemically unstable, two ways of mechanism for terminating polymerization can be assumed, that is, a mechanism where proton is removed (path-1) and a mechanism where the fluorine anion generated by decomposition of the complex catalyst is introduced (path-2).

When the parh-1 mechanism is followed, as proposed by Puskas et al. as above, either the proton of methyl group is removed to form a butene oligomer having the terminal vinylidene group as shown in the above formula, or the proton of inner methylene group is removed to form a butene oligomer having the tri-substituted double bond.

However, when the path-2 mechanism is followed, a butene oligomer having the fluorinated terminal group and the decomposed catalyst of $BF_2OR$ (R represents a hydrocarbon group.) are formed. That is, the fluorine anion generated by the decomposition of complex catalyst is combined with a butene oligomer cation to form a butene oligomer fluorinated at the terminal, and the complex catalyst is changed into the form of $BF_2OR$ at the same time when the complex catalyst is decomposed.

Incidentally, when a starting material of pure isobutene is polymerized using boron trifluoride type complex catalysts, the butene oligomer having the residual fluorine atom content as low as 5 ppm or so can be produced without removing fluorine. Besides, in Japanese Patent Publication No. H07-268033 (corresponding to U.S. Pat. No. 5,674,955), a polymerization technique which gives butene oligomer using a butadiene raffinate as a starting material and boron trifluoride type complex catalysts is disclosed. Therein, it is described that the content of molecules having the terminal vinylidene group is 80 moles %, and the butene oligomer having the fluorine atom content as low as 40 ppm or less can be obtained. However, in the method described in the above specification, the butenes content in butadiene raffinate which is commercially available at a low price is reduced to the level by 20% or more lower than the initial one by hydrogenation in order to maintain such a high content of the terminal vinylidene structure and reduce the fluorine atom content to 40 ppm or less.

As surmised according to the known literature, the above alteration of the form of $BF_3$ and the formation of butene oligomer fluorinated at the terminal are considered to be caused by the direct influence given by butenes particularly other than isobutene in a starting material of $C_4$ at polymerization. Therefore, as long as butene oligomers are produced using a starting material of butadiene raffinate and boron trifluoride type complex catalysts, the formation of butene oligomers fluorinated at the terminal cannot be avoided.

As mentioned above, it has been a big problem how the remaining butene oligomer fluorinated at the terminal can be removed from the inevitably produced butene oligomer fluorinated at the terminal without reducing the terminal vinylidene content. The present inventors have solved this problem by finding the following means.

That is, they found out that the terminal of oligomer can be altered from the fluorinated one into a useful terminal vinylidene group as represented by the following formula, by treating the oligomer obtained in the above Step (III) with an inorganic solid agent in Step (IV) of the present invention.

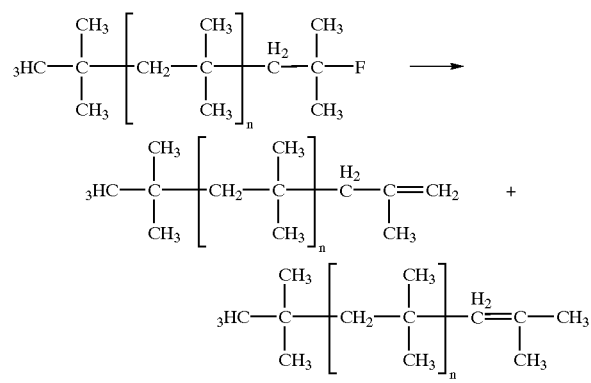

Though the butene oligomer obtained in the above Step (III) contains 0.005–15 mole % of molecules having the fluorinated terminal groups, the content can be reduced to 0.05 mole % or less, further preferably 0.005 mole % or less by treating with an inorganic solid treating agent.

Further, harmful fluorinated terminal groups are converted into butene oligomers having useful vinylidene group and tri-substituted double bond by this treatment. When the condition of treatment is optimized, the conversion rate is about 100%, and the selectivity for vinylidene group is 80 mole % or more. As a result, not only harmful fluorinated terminal group can be removed, but also the yield of butene oligomers having the terminal vinylidene group can be improved to some extent.

In Step (IV), the butene oligomer which is brought into contact with the above inorganic solid agent containing aluminum atoms is not particularly limited, as long as it contains 80 mole % or more of repeating structural units as represented by the formula [1], 60 mole % or more of molecules having terminal vinylidene groups on one side as represented by the formula [2] and 0.005–15 mole % of molecules having fluorinated terminal groups as represented by the formula [3]. However, the butene oligomer which has been subjected to the treatment according to the above method is preferably used.

When the contact treatment of the butene oligomer is carried out as described above in this Step, distillation after deactivation and water washing may be omitted as long as deactivation of catalyst has been finished.

In the following, the treatment with an inorganic solid agent for dehalogenation such as defluorination and dechlorination carried out in the present invention will be explained, preferably with the agent containing aluminum atoms, further preferably with the agent containing alumina.

The substance which is subjected to dehalogenation of the present invention is an organic compound containing halogen compounds as impurity and one or more non-conjugated carbon-carbon double bonds as described at the beginning of this description.

Halogen atoms in halogen compounds are fixed in an inorganic solid agent containing aluminum, and as a result, halogen is removed. The inorganic solid agent containing aluminum atoms is preferably the one containing a component represented by the chemical formula: $Al_2O_3$. The natural or synthetic inorganic substance can be used as long as it contains a component represented by the chemical formula: $Al_2O_3$. As specific inorganic solid agents, there are alumina, silica-alumina and so forth. Alumina is used preferably. As to alumina, any kind of the crystal structure can be used. These may be also the ones formed with appropriate binders. For example, commercially available alumina can be ground appropriately and classified for use. Though the surface area of the inorganic solid agent is not limited particularly, it is usually in the range of 1–500 $m^2/g$.

Further, the inorganic solid agent such as alumina can be modified by impregnation with alkali metals, alkaline earth metals or other metals in the form of oxides, hydroxides or other compounds, or by loading of alkali metals or the like by other appropriate means. However, neither loading nor modification as above is usually necessary, and alumina containing 0.5% by mass of alkali metal or alkaline earth metals such as sodium is used. The alumina that is not or hardly subjected to loading or modification is low in price, which indicates also that the present invention is advantageous.

The organic compound having non-conjugated carbon-carbon double bond, which is to be brought into contact with the inorganic solid treating agent, for example, butene polymer, must be the one after having been subjected to deactivation of catalyst. However, it is not limited whether deactivation and water washing are followed by distillation.

When the viscosity is high, it is preferable to dilute with an inert solvent in order to improve the efficiency of the contact with inorganic solid treating agents such as alumina. As the inert solvents, there are aliphatic hydrocarbon solvents such as n-hexane and isohexane, and the above-mentioned light polymer can be used also as a solvent. When the light polymer is used as a solvent, unreacted $C_4$ fraction is removed from a reaction mixture and a light polymer is recovered by distillation then used. Otherwise, after only unreacted $C_4$ fraction is removed from a reaction mixture, the mixture containing a light polymer can be used directly for the contact treatment with an inorganic solid treating agent.

The temperature at the contact of the inorganic solid treating agent such as the one containing alumina with a butene polymer depends on the kind of inorganic solid treating agent and the amount of the basic substance to be used. However, it is preferably in the range of 0° C. to 350° C., further preferably in the range of 20° C. to 300° C. If the temperature of treatment is higher than this range, olefinic compounds to be treated begin to be decomposed, though the concentration of the residual halogen is reduced. On the other hand, when the temperature is lower, the concentration of the residual halogen is not or hardly reduced. Accordingly, both cases are unfavorable.

The contact time of the inorganic solid treating agent such as the one containing alumina with the organic compound such as butene polymer is not limited as long as the amount of the residual halogen can be reduced. However, it is usually in the range of about 1 minute to 10 hours preferably. If it is shorter than this range, the contact is generally insufficient, and if it is longer, the cost of equipment increases unfavorably.

As the method for contact, any of batch system or continuous system can be used. In the case of a continuous system, the types of fixed bed, fluidized bed and so forth can be used. As the direction of flow, any of up-flow type or down-flow type can be adopted.

The state of the surface of alumina after treatment with the above inorganic solid treating agent such as alumina was analyzed using the surface analyses such as X-ray diffraction and XPS (X-ray photoelectron spectroscopy). As a result, the reaction mechanism when the terminal of oligomer is converted from fluoride to vinylidene group can be considered as follows.

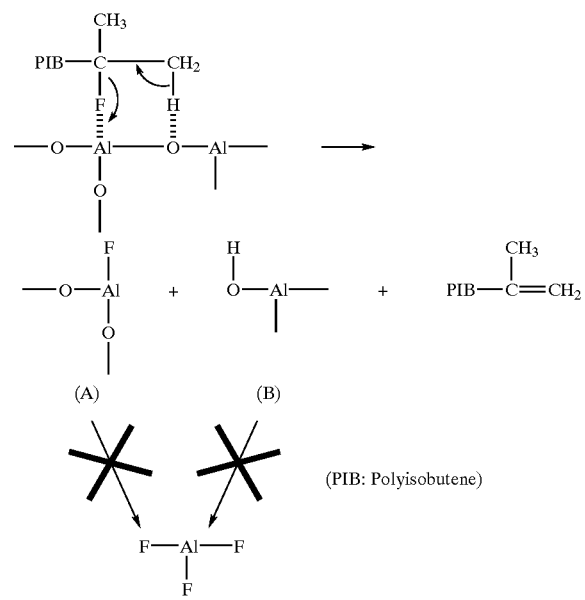

In the above reaction, it can be considered that the fluorinated terminal group is converted into a vinylidene group according to the following steps.

First, the fluorine atom in a butene oligomer fluorinated at the terminal is adsorbed by an aluminum atom in Al—O—Al combination on the surface of alumina. After that, the above fluorine atom transfers onto the alumina and forms alumina decomposition products (A) and (B), in which course the fluorinated terminal group is supposedly converted into a terminal vinylidene group.

Further, because a compound of $AlF_3$ having a high activity as acid is not detected at all, the reaction of treatment is considered to be terminated at the point when the above alumina decomposition products (A) and (B) are formed.

As above, by carrying out the present Step (IV), it is possible to produce the butene oligomer by using a starting material of butadiene raffinate commercially available at low price and a boron trifluoride type complex catalyst, which oligomer does not substantially contain butene oligomer fluorinated at the terminal and contains highly reactive and useful terminal vinylidene groups in the amount not less than that before the treatment.

That is, this butene oligomer has an advantage of reacting with maleic anhydride to form the reaction product in high yield owing to the high content of the terminal vinylidene group. Further, because it does not substantially contain the butene oligomer fluorinated at the terminal, the evolution of fluorine to the atmosphere is little even when the butene oligomer or its derivative is burned. Therefore, it is useful as a raw material for goods causing less environmental pollution.

By the above reaction mechanism, the possibility has been proposed that a fluorine atom transfers onto the aluminum atom and the aluminum decomposition products (A) and (B) are formed. These decomposition products have relation to the formation of acidic sites.

That is, when organic compounds such as butene polymer is brought into contact with an inorganic solid treating agent containing aluminum atoms for dehalogenation, strong acidic sites are newly formed by halogen atoms such as fluorine atom fixed to the inorganic solid treating agent. Then, it is seen that non-conjugated carbon-carbon double bonds in organic compounds are isomerized because of the strong acidic sites. For example, when an organic compound to be treated by dehalogenation is a butene polymer containing a large amount of the terminal vinylidene group, the halogen is removed by dehologenation, though the position of double bond in vinylidene group is moved by isomerization, and the high content of vinylidene group is reduced. In addition, when 1-butene or the like is to be treated by dehalogenation, it is seen that 1-butene is isomerized to 2-butene as a by-product.

As the measures, a basic substance is caused to exist in a reaction system of dehalogenation according to the present invention. That is, when organic compounds containing a halogen compound as an impurity and having one or more non-conjugated carbon-carbon double bonds is brought into contact with an inorganic solid treating agent containing aluminum atoms to remove halogen, the dehalogenation is carried out in the condition that a basic substance such as ammonia or amines exists in a reaction system in the amount sufficient to suppress the isomerization of the above carbon-carbon double bonds of the organic compounds. By the way, the method of treating the inorganic solid treating agent for dehalogenation such as alumina previously with a basic substance is not so effective, because the above isomerization is caused by the strong acidic sites newly formed by dehalogenation.

As a specific method of adding a basic substance, when an organic compound and alumina are continuously brought into contact for dehalogenation in a fixed bed or a fluidized bed, it is possible to feed a basic substance continuously into a fluid comprising an organic compound.

Further, in the case of continuous contact, a basic substance can be fed also intermittently into a fluid. When a basic substance is fed intermittently, it is preferable to begin the supply of basic substance before or immediately after the isomerizability of alumina starts to increase after the contact treatment of the organic compound with alumina is continued.

Further, when dehalogenation is continued without coexistence of a basic substance and the isomerizability of alumina is increased while the ability of dehalogenation is maintained at a constant level, it is also possible to bring it into contact with a basic substance and so reduce the isomerizability to regenerate alumina while maintaining the ability of dehalogenation.

As an example of the methods, after the dehalogenation treatment of a fixed amount of organic compound is carried out continuously using a fixed bed, it is possible to stop the feeding of the organic compound to be treated, feed a basic substance separately in a system to bring it into contact with alumina and reduce the increased isomerizability to regenerate alumina as an inorganic solid agent. Otherwise, after the dehalogenation treatment of a fixed amount of organic compound is carried out in a batch system, it is possible to withdraw the organic compound, introduce a basic substance to bring it into contact with alumina, and reduce the increased isomerizability to regenerate alumina.

The amount of a basic substance used here is generally very small, therefore it is usually preferable to bring it in contact with alumina after diluting with an inert gas or liquid. As examples of inert gas or liquid, there are gases such as nitrogen and air, or aliphatic hydrocarbon solvents such as n-hexane and isohexane. The above light polymer can be recovered and used as a solvent. Of course, the organic compound itself to be treated for defluorination can be also used as a solvent.

As the basic substance used according to the present invention, basic nitrogen-containing compounds are exemplified. Specific basic nitrogen-containing compounds include primary, secondary and tertiary organic amines. These compounds can contain weakly acidic parts such as carboxylic group in a molecule.

nExemplified as organic amines are amines such as methylamine, dimethylamine, ethylamine, diethylamine, triethylamine, propylamine, isopropylamine, diisopropylamine, 2-ethylhexylamine, diisobutylamine, sec-butylamine, tert-butylamine, tri-n-octylamine, di-2-ethylhexylamine, allylamine, diallylamine, triallylamine, aniline, benzylamine, ethylenediamine, hexamethylenediamine, tretramethylethylenediamine, diethylenetriamine, triethylenetetramine, and tetraethylpentamine; amines such as 3-(methylamino) propylamine, 3-(dimethylamino)propylamine, and 3-(dibuttylamino) propylamine; oxyamines such as 3-methoxypropylamine, 3-ethoxypropylamine, and 3-(2-ethylhexyloxy) propylamine; hydroxylamines such as N-methylethanolamine, N,N-dimethylethanolamine, N,N-diethylethanolamine, N,N-dibutylethanolamine, N-methyldiethanolamine, N-(2-aminoethyl)ethanolamine, and 3-amino-1-propanol; and pyridines such as pyridine and aminopyridine. Moreover, amino acids such as β-alanine are effective. However, the amines to be used are not particularly limited to the above examples. The basic substances classified as weak bases are preferable.

The basic substance used according to the present invention is usually separated from the organic compound having been treated for defluorination after the treatment. Accordingly, when the compound having the boiling point sufficiently different from that of the organic compound treated for defluorination is selected, it can be separated with ease using a simple separating operation of distillation favorably.

The amount of the basic substance to be used must be only enough to suppress the isomerization of non-conjugated carbon-carbon double bonds in an organic compound. As mentioned above, a basic substance is used in order to neutralize the acidic sites newly formed by halogen atoms fixed in an inorganic solid treating agent containing aluminum atoms. However, it is difficult to determine the amount of the acidic sites newly formed as above and the strength as acidic sites. The acidic sites influencing the isomerization of double bonds are great in acid strength, and specific acid strength varies depending on each organic compound.

In general, a basic substance does not largely influence the treatment of defluorination itself, even if it exists in excess in a reaction system. When it is in excess, there is an economical disadvantage that the operation of separating the large amount of basic substance is required after the treatment of defluorination.

Further, the degree of isomerization of non-conjugated carbon-carbon double bonds contained in an organic compound is often easily identified by analyzing the organic compound with various instruments.

Therefore, as to the amount of the basic substance used in the present invention, it is necessary for the amount sufficient to suppress the isomerization of non-conjugated carbon-carbon double bonds to exist together. Specifically, 0.00001 mole or more, preferably 0.0005 mole or more, further preferably 0.001 mole or more of basic substance relative to 1 mole of halogen atoms existing in a reaction system under the contact treatment can coexist in the reaction system, wherein the amount of halogen atoms indicates the total amount of halogen compounds contained in an organic compound and halogen atoms fixed in an inorganic treating solid agent. When the above amount coexists, it is usually supposed to be sufficient to suppress the isomerization of non-conjugated carbon-carbon double bonds in an organic compound.

If the amount of a basic substance is less than this range, the isomerizability cannot be sufficiently reduced, which is unfavorable. If the amount of a basic substance is in excess, though the ability of dehalogenation is not so largely hindered, it is economically disadvantageous in that the cost increases for recovering the excess of basic substance as mentioned above. Therefore, it is usually suitable to limit the amount to 200 mole or less relative to 1 mole of the residual halogen atoms in organic compounds such as olefinic compound to be treated.

When the basic substance is fed intermittently, the amount sufficient to suppress the isomerizability by the strong acidic sites which are formed by alumina having fixed halogen atoms such as fluorine is required. Specifically, the ratio of 0.00002 mole or more, preferably 0.001 mole or more, further preferably 0.002 mole or more of an inorganic solid treating agent relative to 1 mole of halogen atoms fixed on alumina.

If the amount of a basic substance is less than this range, it is unfavorable for the same reason as that in the case of allowing coexistence continuously. If the amount is added in excess, though the ability of dehalogenation is not so largely hindered, it is economically disadvantageous in that the cost increases for recovering the excess of basic substance. Therefore, it is usually suitable to limit the amount to 200 mole or less relative to 1 mole of the halogen atoms fixed on an inorganic solid agent such as alumina.

A simple standard for determining the amount of the basic substance to be added is as follows. When the concentration of the residual halogen (converted into halogen atom) contained in an organic compound is on the level of several percent or less, it can be selected from the range of 1 to 50,000 ppm, preferably 1 to 10,000 ppm relative to an organic compound to be treated.

Further, when the amount of a basic substance is determined in the present invention, it is possible to regard the amount to be or having been removed, which is calculated based on the halogen content of a starting material, as the amount of halogen to be fixed on an inorganic solid agent. For example, when a raw material containing 100 ppm of halogen is fed continuously to carry out dehalogenation and reduce it to the aim of 5 ppm, it is possible to regard the amount corresponding to the difference of 95 ppm as the amount of halogen atom to be fixed and determine the amount of supply of the above amine or the like. When a certain amount of halogen has been treated without amine or the like being added, the amount of the amine or the like to be fed can be also calculated, regarding the difference of the halogen atom contents before and after the treatment of defluorination as the amount of the halogen having been fixed. Even if the amount of supply of a basic substance is in excess, the disadvantage owing to the excess is actually negligible.

Further, when the inorganic solid agent such as alumina having the increased isomerizability is brought into contact with a basic substance in order to regenerate the alumina by reducing the isomerizability while maintaining the ability of dehalogenation, the amount of 0.00001 mole or more, preferably 0.0005 mole or more is used relative to 1 mole of halogen atoms fixed on the inorganic solid agent. In this case, the aim is simply regeneration and not dehalogenation, therefore there is no upper limit to the amount of a basic substance. However, if it is used in large excess, the operation of recovering the excessive amount is uneconomical. In general, it is sufficient that a maximum of 200 mole of basic substance is brought into uniform contact with 1 mole of halogen atoms fixed on the inorganic solid treating agent such as the one containing alumina.

The conditions such as temperature for the above regeneration can be selected appropriately, for example, the temperature range of $-100°$ C. to $+400°$ C. can be selected. When only regeneration is carried out to reduce the increased isomerizability through the treatment with a basic substance without simultaneous dehalogenation, it is possible to select the more moderate conditions than in the case of dehalogenation.

By carrying out the treatment for dehalogenation, then removing excess of basic substance and, if any, a solvent, it is possible to obtain the organic compound such as olefinic compound having the reduced concentration of residual halogen.

With the treatment of dehalogenation according to the present invention, it is possible to obtain the organic compound such as olefinic compound which has the residual halogen concentration in the organic compound reduced to 40 ppm or less, preferably 30 ppm or less as a halogen atom, and has the isomerization rate of non-conjugated carbon-carbon double bonds maintained at less than 40%, preferably less than 30%, further preferably less than 20%. That is, the amount of non-conjugated carbon-carbon double bonds having the terminal vinylidene structure can be maintained at 60% or more, preferably 70% or more, further preferably 80% or more compared with that before the treatment of dehalogenation.

The obtained organic compounds such as an olefinic compound or its modified one do not substantially contain the residual halogen such as fluorine. Therefore, when they are burned, the evolution of halogen such as fluorine to the atmosphere is little, so that they are also useful from the viewpoint of environmental protection.

BEST METHOD FOR CARRYING OUT THE INVENTION

In the following, the present invention will be described in more detail with examples.

<EXAMPLE 1>

(Step of Production)

Into a recycling type reaction vessel of 4 liter was fed a $C_4$ fraction (23.8 mass % of 1-butene, 12.4 mass % of 2-butene and 51.6 mass % of isobutene, 12.2 mass % of butanes as saturated component, and trace of butadiene (total: 100 mass %)) at the flow rate of 4 liter per hour, and 0.15 mass % of boron trifluoride and 0.14 mass % of ethanol relative to isobutene were introduced separately into the reaction vessel. Polymerization was carried out continuously using the temperature of $-10°$ C. and LHSV of about 1 $h^{-1}$.

(Step of Deactivation and Water Washing)

The obtained reaction liquid was treated with an aqueous solution of 2% NaOH to carry out the deactivation and neutralization of catalysts, further, washed twice with demineralized water. After washing, it was dried and distilled to obtain butene polymer having the number average molecular weight of 1,300, the terminal vinylidene content of 91% and the residual fluorine concentration of 78 ppm.

(Step of Removing the Residual Fluorine)

Activated alumina (produced by IFP Procatalyse K.K., trade name: PSG-D25) was dried under reduced pressure at 150° C. for 2 hours, ground to particles being 0.5 mm to 1.4 mm in diameter and filled into a fixed bed vessel having a capacity of 100 cm³.

The former butene polymer was diluted with a solvent of isoparaffin so that the viscosity at 25° C. would be 30 poise (3 Pa.s), and was carried through the above packed vessel with varying temperature and WHSV. Samples were collected at the time when the ratio of throughput to packed volume attained 24 to measure the terminal vinylidene content of butene polymer and the concentration of the residual fluorine.

The number average molecular weight was measured using GPC (produced by Shimadzu Corp.), the terminal vinylidene content using NMR (produced by JEOL Ltd. (Nihon Denshi K.K.)) and the residual fluorine concentration using Wickbold-colorimetry.

The results of measuring the residual fluorine concentration and the terminal vinylidene content after the treatment are shown in Table 1.

TABLE 1

|  | WHSV | | |
| --- | --- | --- | --- |
|  | $1h^{-1}$ | $2h^{-1}$ | $4h^{-1}$ |
| 150° C. | 1 or less 79/91 | 1 or less 83/91 | 1 or less 88/91 |
| 130° C. | 1 or less 91/91 | 1 or less 88/91 | — |
| 110° C. | 1 or less 91/91 | 1 or less 90/91 | — |
| 90° C. | 1 or less 91/91 | 2 89/91 | — |
| 70° C. | 3 90/91 | — | — |

Upper section: Residual fluorine concentration after treatment (ppm)
Lower section: Terminal vinylidene content (%, after/before treatment)

<COMPARATIVE EXAMPLE 1>

A butene polymer having the molecular weight of 1,800, the residual fluorine concentration of 130 ppm and the terminal vinylidene content of 88% was diluted to 50% with n-hexane in order to improve the contact efficiency. The viscosity of this liquid at 25° C. was 5 cP (5 mPa.s). Into 100 ml of this diluted polymer was put 27 g of silica gel (trade name: Silbead N, produced by Mizusawa Industrial Chemicals, Ltd.) having been heated under dried nitrogen current at 150° C., and the mixture was stirred at room temperature for 1 hour.

The terminal vinylidene content of butene polymer after the treatment was 88% and the fluorine content was 66 ppm.

Accordingly, in the case of the butene polymer obtained by polymerizing $C_4$ fraction using boron trifluoride as catalyst, fluorine cannot be removed sufficiently by using the treatment with silica gel.

<EXAMPLE 2 TO 5, COMPARATIVE EXAMPLE 2 to 5>

(Starting Material for Polymerization)

Butadiene raffinate (a residual substance remaining after the extraction of butadiene from a $C_4$ fraction of an ethylene cracker) containing isobutene was used as a starting material. The composition of $C_4$ fraction is as follows (% by mass).

| Isobutene | 50.9 |
| --- | --- |
| 1-Butene | 23.2 |
| cis-2-Butene | 2.8 |
| trans-2-Butene | 6.4 |
| Isobutane | 5.4 |
| n-Butane | 11.3 |
| Total | 100.0 |

(Specifications of Polymerization Apparatus and Procedure of Polymerization)

Polymerization was carried out using a continuous apparatus described in the following. That is, a loop type reactor having an internal volume of 4 liter was set up, which reactor comprises a variable stirrer, a cooling apparatus equipped with devices of recycling a low-temperature medium and of adjusting a constant temperature, an inlet of raw material, an inlet of $BF_3$ gas catalyst, an inlet of complexing agent, a temperature indicator of polymerization and an outlet.

The liquefied starting material as mentioned above was introduced into the reactor at the flow rate of 4 liter per hour, and 0.15 mass % of $BF_3$ gas and 0.14 mass % of complexing agent (ethanol selected at this Example) relative to isobutene were introduced with constant volume pumps at their respective inlets to carry out polymerization continuously. The conversion rate of isobutene in butadiene raffinate was calculated using the change of compositions measured by a gas chromatography on a feed material and a reaction liquid before and after the reaction.

The reaction liquid flowing out after the reaction was introduced into a deactivation vessel successively, and washed with a diluted aqueous solution of sodium hydroxide until the residual $BF_3$ complex catalyst was deactivated. After that, an organic phase was separated, from which phase the unreacted part of the starting material and the lower fraction having the carbon number of 24 or less were distilled out by vacuum distillation. Butene oligomer was obtained from the remaining product, and the yield was calculated.

The molecular weight of the butene polymer was measured by GPC, and the molecular skeleton and the assignment and determination of olefin structures in the molecular terminals were measured by NMR.

(Specifications of Inorganic Solid Treatment Apparatus and Procedure of Treating)

Activated alumina (produced by IFP Procatalyse K.K., trade name: PSG-D25) having been previously dried under reduced pressure at 150° C. for 2 hours was filled into a fixed bed vessel having a capacity of 100 cm³. The alumina was ground to particles being 0.5 mm to 1.4 mm in diameter for use. The fixed bed vessel could be heated with an external heat source, by which the internal temperature of each part could be controlled uniformly at the treatment temperature in the range of 0° C. to 400° C.

The procedure of inorganic solid treatment is as follows.

First, the butene oligomer refined by distillation in Step of polymerization is diluted with a solvent of isoparaffin to adjust the viscosity at 25° C. to about 30 poise (3 Pa.s). The obtained diluted solution was sent to the above fixed bed vessel, and the treatment temperature at each part was adjusted to a uniform value according to the experimental condition. The space velocity (WHSV) of feed was fixed at 1 $h^{-1}$, and samples were collected at the time when the ratio of throughput to packed volume attained 24 to carry out the analysis.

The molecular skeleton of butene oligomer and the assignment and determination of olefin structures in the molecular terminals were measured in the same way as in Step of polymerization.

All the experiments were carried out according to the above polymerization procedure and the procedure of inorganic solid treatment.

The temperatures of polymerization and inorganic solid treatment are shown in Table 2.

TABLE 2

Experimental Temperature

| | Temperature of Polymerization (° C.) | Temperature of Inorganic Solid Treatment (° C.) |
|---|---|---|
| Example 2 | −10 | 110 |
| Example 3 | −20 | 110 |
| Example 4 | −10 | 130 |
| Example 5 | −20 | 130 |
| Comp. Ex.(*) 2 | −10 | 10 |
| Comp. Ex. 3 | −20 | 10 |
| Comp. Ex. 4 | −10 | 230 |
| Comp. Ex. 5 | −20 | 230 |

Note
(*)Comp. Ex.: Comparative Example

The conversion rate of isobutene, the yield of butene polymer, and the number average molecular weight (Mn) and the molecular weight distribution (Mw/Mn) of the obtained butene polymer are shown in Table 3.

TABLE 3

Results of Polymerization

| | Conversion Rate of Isobutene (%) | Yield of Butene Polymer (%) | Butene Polymer Mn | Butene Polymer Mw/Mn |
|---|---|---|---|---|
| Example 2, 4 Comp. Ex. 2, 4 | 91.6 | 43.5 | 1191 | 1.58 |
| Example 3, 5 Comp. Ex. 3, 5 | 92.2 | 44.6 | 2249 | 1.67 |

The contents of the molecules having the terminal vinylidene group and the fluorinated terminal group respectively in the butene oligomer after polymerization, deactivation of catalyst and distillation, and in the butene oligomer after inorganic solid treatment are shown in Table 4.

TABLE 4

Contents of Molecule having Each Terminal Group

| | After Polymerization and Distillation | | After Inorganic Solid Treatment | |
|---|---|---|---|---|
| | Terminal Vinylidene Group (mol. %) | Fluorinated Terminal Group (mol. %) | Terminal Vinylidene Group (mol. %) | Fluorinated Terminal Group (mol. %) |
| Example 2 | 85 | 0.62 | 86 | 0.00 |
| Example 3 | 84 | 1.17 | 85 | 0.00 |
| Example 4 | 85 | 0.62 | 85 | 0.00 |
| Example 5 | 84 | 1.17 | 84 | 0.00 |
| Comp. Ex. 2 | 85 | 0.62 | 85 | 0.06 |
| Comp. Ex. 3 | 84 | 1.17 | 84 | 0.12 |
| Comp. Ex. 4 | 85 | 0.62 | 47 | 0.00 |
| Comp. Ex. 5 | 84 | 0.62 | 53 | 0.00 |

In the butene polymer obtained in each Example, 90% or more of the number of the repeating structural units had the structure shown in the formula [1], whether the inorganic solid treatment was carried out or not.

<Reference Example>
(Experiment of Isolating the Butene Oligomer Fluorinated at the Terminal)

The isolation of the butene oligomer fluorinated at the terminal was carried out according to the following procedures.

First of all, 5,500 g of the butene oligomer which was obtained by polymerization and distillation in Example 2 and containing 0.62% by mole of the molecule having the fluorinated terminal group was diluted with dehydrated n-hexane so as to obtain 73 mass %. This mixture liquid was put in a separable flask of 5 liter, and 500 g of dried silica gel (WAKO GEL) was put in the mixture with stirring. After adding silica gel, stirring was continued for 24 hours.

After the prescribed period of time, stirring was stopped and the mixture was allowed to stand still, then the supernatant liquid of hexane was removed by decantation. The lower phase of solid consisting of mainly silica gel was washed entirely with dehydrated n-hexane, and then filtered. The supernatant liquid separated by decantation and the washing liquid of dehydrated n-hexane were combined together, and the solvent was distilled away.

As to the silica gel subjected to filtration and washing, the substance adsorbed by silica gel was desorbed with a large quantity of methylene chloride selected as a desorbing liquid.

(Determination of the Constitution of Butene Oligomer Fluorinated at the Terminal)

The viscous substance obtained after desorption as above was measured by NMR as described in the following. The measuring means necessary to determine the constitution are (1) $^1$H-NMR, (2) $^{13}$C-NMR and (3) $^{19}$F-NMR. The results of measurement and analysis are shown in Table 5 to Table 7, respectively.

TABLE 5

Results of measurement by $^1$H-NMR
[3999.65 MHz, CDCl$_3$, internal standard: TMS]

| Chemical Shift δ (ppm) | Splitting Pattern | Bonding for Assignment |
|---|---|---|
| 0.99–1.38 | broad | —CH$_3$, —CH$_2$ |
| 3.15 | singlet | —C(CH$_3$)$_2$F |

TABLE 6

Results of measurement by $^{13}$C-NMR
[100.40 MHz, CDCl$_3$, internal standard: TMS]

| Chemical Shift δ (ppm)<br>(Classification of Carbon[1]) | Bonding for Assignment |
|---|---|
| 27.5 (s), 29.3 (s), 30.4 (s), 30.7 (s),<br>31.2(s), 32.4 (s) | —CH$_3$[2] |
| 36.6 (q), 37.5 (q), 38.1(q) | 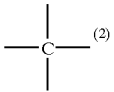 [2] |
| 53.0 (d), 58.1 (d), 58.8 (d), 59.5(d)<br>48.7 (s)<br>76.0 (q) | —CH$_2$—[2]<br>—C(CH$_3$)$_2$F<br>—C(CH$_3$)$_2$F |

Notes
[1]Measured by DEPT (Distortionless Enhancement by Polarization Transfer); s: primary, d: secondary, t: tertiary and q: quaternary
[2]Bonding group in a growing chain of isobutene polymer; The underlined data correspond to the internal carbons in a chain.

TABLE 7

Results of measurement by $^{19}$F-NMR
[376.00 MHz, CDCl$_3$, external standard: BF$_3$MeOH (on the market)]

| Chemical Shift δ (ppm) | Splitting Pattern | Bond Constant | Bonding for Assignment |
|---|---|---|---|
| −16.7 | multiplet | J(CH$_3$–F) = 21–23 Hz[3] | —C(CH$_3$)$_2$F |

Note
[3]This result indicates that the terminal is a fluorinated tertiary carbon.

From the above NMR analysis, it was found out that most of the viscous substance isolated in a series of isolation experiments has the structure shown in the following structural formula, that is, 80% or more of the amount of the repeating structural units consists of isobutene skeleton and one of the terminal groups is composed of a specific structure of fluorinated tertiary carbon.

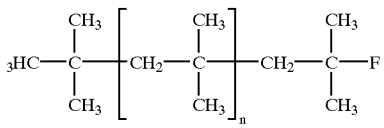

<EXAMPLE 6>

(Step of Polymerization)

Butadiene raffinate from a C$_4$ fraction of an ethylene cracker was fed into a recycling type reaction vessel of 4 liter at the flow rate of 4 liter per hour, and 0.15% by mass of boron trifluoride and 0.14% by mass of ethanol relative to isobutene were introduced separately into the reaction vessel. Polymerization was carried out continuously at the reaction temperature of −10° C. The composition of the butadiene raffinate is shown in Table 8. The analysis was carried out using a gas chromatography (the same hereinafter).

TABLE 8

| Component | Content (% by mass) |
|---|---|
| Isobutene | 50.5 |
| 1-butene | 23.2 |
| 2-butene | 10.6 |
| n-butane | 10.8 |
| Isobutane | 4.9 |
| Butadiene | trace |
| Total | 100.0 |

(Step of Deactivation and Water Washing)

The reaction liquid obtained above was treated with an aqueous solution of 2% NaOH to carry out the deactivation and neutralization of catalysts, further, washed three times with demineralized water. After washing, it was dried and the unreacted C$_4$ component was recovered by distillation. As the result of analyzing the recovered unreacted C$_4$ component, the concentration of the residual fluorine was 4.5 ppm. The composition is shown in Table 9.

TABLE 9

| Component | Content (% by mass) |
|---|---|
| Isobutene | 8.4 |
| 1-butene | 42.4 |
| 2-butene | 19.7 |
| n-butane | 20.3 |
| Isobutane | 9.2 |
| Butadiene | trace |
| Total | 100.0 |

(Step of Defluorination)

Then, activated alumina (produced by IFP Procatalyse K.K., trade name: PSG-D25) was dried under reduced pressure at 200° C. for 2 hours, ground and classified as particles being 2 mm to 3.5 mm in diameter and filled into a cylinder vessel which was equipped with a fluid inlet at the bottom and a fluid outlet at the top and having a capacity of 10 liter. At the fluid inlet of this cylinder vessel was connected a line for feeding the unreacted C$_4$ component recovered previously. Ammonia was mixed as a defluorinating agent previously so that the concentration would be 4 ppm relative to the unreacted C$_4$ component.

The temperature of defluorinating treatment was 210° C., and the flow rate of the unreacted C$_4$ fraction mixed with ammonia was 100 ml per hour. After the defluorinating treatment started, the outlet gas was collected as a sample at appropriate intervals up to 1,000 hours after the start-up to measure the concentrations of 1-butene and 2-butene and the concentration of residual fluorine in the C$_4$ component.

The changes depending on time after the treatment in the residual fluorine concentration and the terminal vinylidene content after the treatment are shown in Table 10.

TABLE 10

| Time | (h) | 240 | 480 | 750 | 1,000 |
|---|---|---|---|---|---|
| Concentration of 1-butene | (%) | 42.4 | 42.3 | 42.4 | 42.4 |
| Concentration of 2-butene | (%) | 19.7 | 19.8 | 19.7 | 19.7 |

TABLE 10-continued

| Time | (h) | 240 | 480 | 750 | 1,000 |
|---|---|---|---|---|---|
| Concentration of Remaining Fluorine | (ppm) | 1 or less | 1 or less | 1 or less | 1 or less |

<COMPARATIVE EXAMPLE 6>

The experiment was carried out in the same way entirely as in Example 6 except that ammonia was not added. The results are shown in Table 11, wherein 1-butene is isomerized into 2-butene obviously.

TABLE 11

| Time | (h) | 240 | 480 | 750 | 1,000 |
|---|---|---|---|---|---|
| Concentration of 1-butene | (%) | 42.2 | 42.0 | 40.6 | 38.2 |
| Concentration of 2-butene | (%) | 19.9 | 20.0 | 21.5 | 24.0 |
| Concentration of Remaining Fluorine | (ppm) | 1 or less | 1 or less | 1 or less | 1 or less |

<COMPARATIVE EXAMPLE 7>

The experiment was carried out in the same way as in Example 6 except that silica gel (trade name: Silbead N, produced by Mizusawa Industrial Chemicals, Ltd.) having been heated under dried nitrogen current at 150° C. was filled into a cylinder vessel instead of alumina, and that the treatment was carried out at the room temperature.

The concentrations of 1-butene and 2-butene in the $C_4$ component after the treatment were not changed compared to those before the treatment, that is, isomerization was not noticed. However, the concentration of the residual fluorine was 4.0 ppm even at the beginning of treatment, therefore the removing treatment did not have any effect.

<EXAMPLE 7>
(Step of Polymerization)

Butadiene raffinate (the same as in Table 8) from a $C_4$ fraction of an ethylene cracker was fed into a recycling type reaction vessel of 4 liter at the flow rate of 4 liter per hour, and 0.15% by mass of boron trifluoride and 0.14% by mass of ethanol relative to the amount of isobutene were introduced separately into the reaction vessel. Polymerization was carried out continuously at the reaction temperature of −10° C.

(Step of Deactivation and Water Washing)

The obtained reaction liquid was treated with an aqueous solution of 2% NaOH to carry out the deactivation and neutralization of catalysts, further, washed three times with demineralized water. After washing, it was dried and the unreacted $C_4$ component was recovered by distillation to obtain butene polymer having the number average molecular weight of 1,300, the terminal vinylidene group content of 91% and the residual fluorine content of 76 ppm.

(Step of Defuluorination)

Activated alumina (produced by IFP Procatalyse K.K., trade name: PSG-D25) was dried under reduced pressure at 200° C. for 2 hours, ground and classified as particles being 0.5 mm to 1.4 mm in diameter and filled into a fixed bed vessel having a capacity of 100 cm³.

In 100 parts by mass of the above butene polymer was added 400 ppm of triethylamine, and further 10 parts by mass of a solvent of isoparaffin (trade name: Nisseki Isosol 300, produced by Nippon Petrochemicals Co., Ltd.) was added to adjust the viscosity. The obtained starting material for defluorination was fed into the above packed vessel.

As the conditions for defluorinating treatment, the temperature was 170° C. and WHSV was 1 h⁻¹. After the start-up of defluorinating treatment, the treated liquid at the outlet of the packed vessel was collected as a sample at appropriate intervals up to 2,030 hours after the start-up to measure the terminal vinylidene group content and the residual fluorine concentration in butene polymer.

The number average molecular weight was measured using GPC (produced by Shimadzu Corp.), the terminal vinylidene content using NMR (produced by JEOL Ltd. (Nihon Denshi K.K.) and the residual fluorine concentration using Wickbold-colorimetry.

The changes depending on the time after the treatment in the residual fluorine concentration and the terminal vinylidene content after the treatment are shown in Table 12.

TABLE 12

| Time (h) | 285 | 550 | 716 | 1,060 | 1,390 | 1,793 | 2,030 |
|---|---|---|---|---|---|---|---|
| Content of Terminal Vinylidene Group (%) | 91 | 90 | 91 | 91 | 91 | 92 | 91 |
| Conc. of Remaining Fluorine (ppm) | 1 or less | 1 or less | 1 or less | 1 or less | 1 or less | 1 or less | 1 or less |

<EXAMPLE 8>

The experiment was carried out in the same way entirely as in Example 7 except that butene polymer containing light polymer, which was obtained by distilling away only unreacted $C_4$ component after neutralization and water washing, was used as a starting material for defluorination (the residual fluorine concentration: 188 ppm), and that the amount of triethylamine was 200 ppm.

The results are shown in Table 13.

TABLE 13

| Time (h) | 285 | 550 | 716 | 1,060 | 1,390 | 1,793 | 2,030 |
|---|---|---|---|---|---|---|---|
| Content of Terminal Vinylidene Group (%) | 91 | 90 | 91 | 90 | 91 | 91 | 91 |
| Conc. of Remaining Fluorine (ppm) | 1 or less | 1 or less | 1 or less | 1 or less | 1 | 3 | 4 |

<COMPARATIVE EXAMPLE 8>

The experiment was carried out in the same way as in the above Example 7 except that triethylamine was not added and the treatment temperature was reduced to 110° C. The results up to 550 hours after the start-up are shown in Table 14. Although the temperature was lower than that used in Example 7, the isomerization of vinylidene structure advanced.

TABLE 14

| Time | (h) | 118 | 285 | 550 |
|---|---|---|---|---|
| Content of Terminal Vinylidene Group | (%) | 82 | 77 | 64 |
| Conc. of Remaining Fluorine | (ppm) | 9 | 9 | 11 |

<EXAMPLE 9>
(Step of Polymerization)

The experiment was carried out in the same way as in Example 6 except that 0.82% by mass of boron trifluoride, 0.89% by mass of diethyl ether and 0.02% by mass of ethanol were added to isobutene as catalyst and complexing agents.

(Step of Deactivation and Water Washing)

Further, the deactivation and water washing were carried out in the same way as in Example 6 to obtain butene polymer having the number average molecular weight of 1,462, the terminal vinylidene group content of 88% and the residual fluorine concentration of 7 ppm.

(Step of Defluorination)

The defluorination treatment was carried out in the same way as in Example 6 except that butene polymer obtained above was used as a starting material for defluorination, that ammonia was mixed before the inlet of the alumina-packed vessel at the flow rate corresponding to 50 ppm relative to butene polymer and that the mixture was fed into the packed vessel under the pressure of 2 MPa. The changes depending on the time after the treatment in the residual fluorine concentration and the terminal vinylidene content after the treatment are shown in Table 15.

TABLE 15

| Time | (h) | 118 | 285 | 550 | 716 | 838 | 1,000 |
|---|---|---|---|---|---|---|---|
| Content of Terminal Vinylidene Group | (%) | 88 | 88 | 88 | 88 | 88 | 88 |
| Conc. of Remaining Fluorine | (ppm) | 1 or less | 1 or less | 1 or less | 1 or less | 1 or less | 1 or less |

<COMPARATIVE EXAMPLE 9>

After silica gel (trade name: Silbead N, produced by Mizusawa Industrial Chemicals, Ltd.) was heated under dried nitrogen current at 150° C., 27 g of the silica gel was put in 100 ml of the starting material for defluorination of butene polymer obtained in the above Example 7, and stirring was carried out for 1 hour.

The terminal vinylidene content after the treatment was 91%, therefore isomerization was not found. However, the residual fluorine concentration after the treatment was 104 ppm. Accordingly, when molecular weight is as large as that of butene polymer, a treatment with silica gel cannot sufficiently remove fluorine.

<EXAMPLE 10>
(Step of Polymerization)

The above-mentioned butadiene raffinate (the same as in Table 8) was introduced into a continuous vessel type reactor having a capacity of 2 liter, which was provided with a stirrer, a thermometer, a pipe for feeding a liquid, a pipe for feeding a gas and a pipe for exhaust gas, at the temperature of 20° C. and at the flow rate of 2 l/h. Aluminum chloride.diethyl ether complex (aluminum chloride: 64.3% by mass, coordination molar ratio: 1.0) was introduced at the flow rate of 6.0 g/h to carry out polymerization.

(Step of Deactivation and Water Washing)

The catalyst of the obtained reaction liquid was deactivated with an aqueous solution of 5% NaOH, and the unreacted olefin and the oligomer of low molecular weight having the carbons number as low as 20 or less and being were distilled away. The conversion rate of isobutene was 43%, and the obtained butene polymer had the terminal double bonds content of 82%, the number average molecular weight of 1,633 and the residual chlorine concentration of 155 ppm.

(Step of Dechlorination)

Activated alumina (produced by IFP Procatalyse K.K., trade name: PSG-D25) was dried under reduced pressure at 200° C. for 2 hours, ground and classified as particles being 0.5 mm to 1.4 mm in diameter and filled into a fixed bed vessel having a capacity of 100 cm$^3$.

In 100 parts by mass of the above butene polymer was added 400 ppm of triethylamine, and further 10 parts by mass of a solvent of isoparaffin (trade name: Nisseki Isosol 300, produced by Nippon Petrochemicals Co., Ltd.) was added to adjust the viscosity. The obtained starting material for dechlorination was fed into the above packed vessel.

As the conditions for dechlorinating treatment, the temperature was 190° C. and WHSV was 1 h$^{-1}$. After the start-up of dechlorinating treatment, the treated liquid at the outlet of the packed vessel was collected as a sample at appropriate intervals up to about 1,800 hours after the start-up to measure the terminal vinylidene group content and the residual chlorine concentration in the butene polymer.

The number average molecular weight was measured using GPC (produced by Shimadzu Corp.), the terminal vinylidene content using NMR (produced by JEOL Ltd. (Nihon Denshi K.K.)) and the residual chlorine concentration using Wickbold-colorimetry.

The changes depending on the time after treatment in the residual chlorine concentration and the terminal vinylidene content after the treatment are shown in Table 16.

TABLE 16

| Time (h) | 251 | 520 | 756 | 1,020 | 1,263 | 1,503 | 1,808 |
|---|---|---|---|---|---|---|---|
| Content of Terminal Vinylidene Group (%) | 82 | 82 | 83 | 82 | 82 | 82 | 81 |
| Conc. of Remaining Chlorine (ppm) | 5 or less | 5 or less | 5 or less | 5 or less | 5 or less | 5 or less | 5 or less |

INDUSTRIAL APPLICABILITY

A butene polymer obtained according to the present invention has a high content of terminal vinylidene group, and can react advantageously with maleic anhydride or the like in high yield. Further, because it does not substantially contain the residual fluorine, the evolution of fluorine to the atmosphere is little even when the butene oligomer or its modified product is burned. Therefore, it is also useful from the viewpoint of environmental protection.

Moreover, according to the present invention, it is possible to produce a highly reactive butene oligomer that maintains the content of the molecules having the terminal vinylidene group and does not substantially contain the residual fluorine, by polymerizing a starting material such as butadiene raffinate, which is commercially available at a low price, with a boron trifluoride catalyst type complex catalyst, then treating with an inorganic solid treating agent.

Further, according to the present invention, it is possible to remove a halogen effectively and economically from an olefinic compounds containing the residual halogen as an impurity while substantially preventing the isomerization of non-conjugated carbon-carbon double bonds as the biggest side reaction.

What is claimed is:

1. A method for producing butene polymer having a low halogen content and a high terminal vinylidene content, comprising:

step (I) feeding into a polymerization zone a starting material of $C_4$ components comprising less than 50% by mass of 1-butene, less than 50% by mass of 2-butene, less than 100% by mass of isobutene, less than 50% by mass of butanes and less than 10% by mass of butadiene, 0.1 to 500 mmole of boron trifluoride relative to 1 mole of isobutene contained in said starting material, and 0.03 to 1,000 mmole of alcohol and/or dialkyl ether as complexing agents relative to 1 mole of isobutene contained in said starting material, and carrying out liquid-phase polymerization continuously at a polymerization temperature in the range of −100° C. to +50° C. and for a residence time in the range of 5 minutes to 4 hours;

step (II) deactivating the catalyst contained in the effluent reaction mixture from the polymerization zone, then optionally subjecting the reaction mixture to distillation, to obtain butene polymer containing residual halogen of 1 ppm or more and terminal vinylidene group of 60% or more; and step (III) contacting said butene polymer with an inorganic solid treating agent containing aluminum atoms, while maintaining the coexistence of a basic substance in an amount to suppress isomerization of said terminal vinylidene group, thereby obtaining butene polymer containing 40 ppm or less of residual halogen and maintaining the content of terminal vinylidene group of 60% or more relative to the value before the treatment.

2. A method for producing butene polymer as claimed in claim 1, wherein the residual halogen content in the polymer obtained in the step (III) is 30 ppm or less.

3. A method for producing butene polymer as claimed in claim 1, wherein the content of terminal vinylidene structure in the polymer obtained in the step (III) is 70% or more relative to the content before the treatment in said step (III).

4. A method for producing butene polymer as claimed in claim 1, wherein the temperature of contact in the step (III) of inorganic solid treating agent containing aluminum atoms with butene polymer containing residual halogen is 0° C. to 350° C.

5. A method for producing butene polymer as claimed in claim 1, wherein the average contact time in the step (III) of the inorganic solid treating agent containing aluminum atoms with the butene polymer containing the residual halogen is 1 minute or more but less than 5 hours.

6. A method for removing halogen as an impurity, which method comprises the step of bringing an organic compound containing a halogen compound as an impurity and having one or more of non-conjugated carbon-carbon double bonds, into contact with an inorganic solid treating agent containing aluminum atoms to remove halogen, while maintaining the reaction system in the coexistence of a basic substance in an amount sufficient to suppress the isomerization of said carbon-carbon double bonds in the organic compound.

7. A method for removing halogen as an impurity as claimed in claim 6, wherein the inorganic solid treating agent contains a component represented by the chemical formula: $Al_2O_3$.

8. A method for removing halogen as an impurity as claimed in claim 7, wherein the inorganic solid treating agent is alumina.

9. A method for removing halogen as an impurity as claimed in claim 6, wherein the halogen compound is a fluorine compound.

10. A method for removing halogen as an impurity as claimed in claim 6, wherein the basic substance is ammonia or organic amines.

11. A method for removing halogen as an impurity as claimed in claim 6, wherein the temperature of contact of said inorganic solid treating agent with the organic compound is from 0° C. to 350° C.

12. A method for removing halogen as an impurity, which method comprises the step of bringing an organic compound containing a halogen compound as an impurity and having one or more non-conjugated carbon-carbon double bonds, into contact with an inorganic solid treating agent containing aluminum atoms to remove halogen, while feeding a basic substance into said organic compound continuously or intermittently in the amount sufficient to suppress the isomerization of said carbon-carbon double bonds in the organic compound.

13. A method for removing halogen as an impurity, which comprises the step of bringing butene polymer of a high terminal vinylidene content that is produced by polymerizing isobutene using a halogen-containing catalyst, into contact with an inorganic solid treating agent containing aluminum atoms, thereby removing halogen, while maintaining the coexistence of a basic substance in the amount sufficient to suppress the isomerization of the terminal vinylidene group in said butene polymer.

14. A method for removing halogen as an impurity, which comprises the step of bringing butene polymer of a high terminal vinylidene content that is produced by polymerizing isobutene using a halogen-containing catalyst, into contact with an inorganic solid treating agent containing aluminum atoms, thereby removing halogen, while feeding a basic substance into said butene polymer continuously or intermittently in the amount sufficient to suppress the isomerization of said terminal vinylidene group.

15. A method for removing halogen as an impurity as claimed in claim 13, wherein the isobutene is a starting material of $C_4$ components containing less than 50% by mass of 1-butene, less than 50% by mass of 2-butene, less than 100% by mass of isobutene, less than 50% by mass of butanes and less than 10% by mass of butadiene.

16. A method for producing butene polymer, which comprises the step of bringing butene polymer containing 1 ppm or more of residual halogen and 60% or more of terminal vinylidene group into contact with an inorganic solid treating agent containing aluminum atoms to remove halogen, while maintaining, in the reaction system, the coexistence of a basic substance in the amount to suppress the isomerization of said terminal vinylidene group, thereby obtaining butene polymer containing 40 ppm or less of residual halogen and the content of terminal vinylidene group of 60% or more relative to value before treatment.

17. A method for producing butene polymer as claimed in claim 16, wherein the residual halogen content of butene polymer after the treatment is 30 ppm or less.

18. A method for producing butene polymer as claimed in claim 16, wherein the content of terminal vinylidene group of butene polymer is maintained at 70% or more relative to the value before treatment.

19. A method for removing halogen as an impurity, which comprises the step of bringing monoolefin containing a halogen compound as an impurity into contact with an inorganic solid treating agent containing aluminum atoms to remove halogen, while maintaining, in the reaction system, the coexistence of a basic substance in the amount sufficient to suppress the isomerization of carbon-carbon double bonds of the monoolefin.

20. A method for removing halogen as an impurity, which comprises the step of bringing monoolefin containing a halogen compound as an impurity into continuous contact with an inorganic solid treating agent containing aluminum atoms to remove halogen, while feeding a basic substance into said monoolefin continuously or intermittently in an amount sufficient to suppress the isomerization of carbon-carbon double bonds of the monoolefin.

21. A method for removing halogen as an impurity as claimed in claim 19, wherein said monoolefin containing a halogen compound as an impurity is the one which was subjected to catalytic action with a halogen-containing catalyst.

22. A method for removing halogen as an impurity as claimed in claim 21, wherein said monoolefin which was subjected to catalytic action with a halogen-containing catalyst is a residual unreacted $C_4$ fraction obtained from the production of butene polymer with a halogen-containing catalyst using a $C_4$ starting material.

23. A method for regenerating an inorganic solid treating agent containing aluminum, which comprises the step of bringing an inorganic solid treating agent containing aluminum atoms having an increased ability of isomerizing non-conjugated carbon-carbon double bonds as the result of fixing halogen, into contact with a basic substance, thereby reducing the isomerizing ability of said treating agent.

24. A method for regenerating an inorganic solid treating agent containing aluminum as claimed in claim 23, wherein said inorganic solid treating agent contains a component represented by the chemical formula: $Al_2O_3$.

25. A method for regenerating an inorganic solid treating agent containing aluminum as claimed in claim 24, wherein said inorganic solid treating agent is alumina.

26. A method for producing a highly reactive butene oligomer, which comprises:

removing hydrogen fluoride by contacting the butene oligomer with an inorganic solid treating agent, said butene oligomer containing 80% by mole or more of repeating structural units as represented by the following formula [1], 60% by mole or more of molecules having terminal vinylidene groups on one side as represented by the following formula [2] and 0.005 to 15% by mole of molecules having fluorinated terminal groups as represented by the following formula [3], thereby converting the fluorinated terminal groups of said formula [3] into the terminal vinylidene groups of said formula [2]:

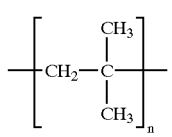

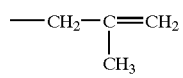

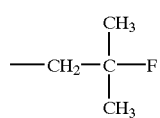

wherein n represents an integer of 1 or more.

27. A method for producing a highly reactive butene oligomer as claimed in claim 26, wherein said inorganic solid treating agent contains aluminum atoms.

28. A method for producing a highly reactive butene oligomer as claimed in claim 26, which comprises the step of decreasing the amount of molecules having the fluorinated terminal group to 0.05% by mole or less by treating with the inorganic solid treating agent.

29. A method for producing a highly reactive butene oligomer as claimed in claim 26, wherein the contact temperature of treating the butene oligomer with the inorganic solid treating agent is in the range of 0 to 350° C.

30. A method for producing a highly reactive butene oligomer as claimed in claim 26, wherein the average contact time in treating the butene oligomer with the inorganic solid treating agent is 1 minute or more but less than 5 hours.

31. A method for producing a highly reactive butene oligomer containing 80% by mole or more of repeating structural units as represented by the following formula [1] and 80% by mole or more of molecules having terminal vinylidene groups on one side as represented by the following formula [2],

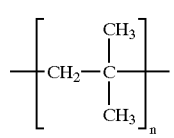

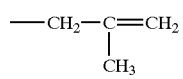

wherein n represents an integer of 0 or more, said method comprising:

Step (I) carrying out liquid-phase polymerization of olefin in the presence of a boron trifluoride complex catalyst comprising boron trifluoride and a complexing agent;

Step (II) deactivating the boron trifluoride complex catalyst in a reaction mixture after the polymerization;

Step (III) obtaining the butene oligomer which contains 80% by mole or more of repeating structural units as represented by the following formula [1], 60% by mole or more of molecules having terminal vinylidene groups on one side as represented by the following formula [2] and 0.005 to 15% by mole of molecules having fluorinated terminal groups as represented by the following formula [3]

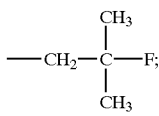

[3]

and

Step (IV) treating the oligomer obtained in said step (III) with an inorganic solid treating agent to carry out the reaction to remove hydrogen fluoride, thereby converting fluorinated terminal groups as represented by the formula [3] into terminal vinylidene groups as represented by the formula [2].

32. A method for producing a highly reactive butene oligomer as claimed in claim 31, wherein the olefin content in a starting material for the liquid-phase polymerization of said Step (I) is at least 5% by mass.

33. A method for producing a highly reactive butene oligomer as claimed in claim 31, wherein the complexing agent forming a complex with boron trifluoride in said Step (I) is selected from the group consisting of water, alcohols, ethers, phenols, ketones, aldehydes, esters, organic acids and acid anhydrides.

34. A method for producing a highly reactive butene oligomer as claimed in claim 31, wherein the molar ratio of boron trifluoride to complexing agent in a boron trifluoride complex catalyst used in said Step (I) is in the range of 0.01:1 to 2:1.

35. A method for producing a highly reactive butene oligomer as claimed in claim 31, wherein the inorganic solid treating agent used in said Step (IV) contains aluminum atoms.

36. A method for producing a highly reactive butene oligomer as claimed in claim 31, which comprises the step of treating the oligomer obtained in step (III) with the inorganic solid treating agent in said Step (IV), thereby decreasing the amount of molecules having the fluorinated terminal groups as represented by the formula [3] to 0.05% by mole or less.

37. A method for producing a highly reactive butene oligomer as claimed in claim 31, wherein the temperature in the contact treatment of the oligomer obtained in Step (III) with the inorganic solid treating agent in said Step (IV) is in the range of 0 to 350° C.

38. A method for producing a highly reactive butene oligomer as claimed in claim 31, wherein the average contact time in the treatment of the oligomer obtained in Step (III) with the inorganic solid treating agent in said Step (IV) is 1 minute or more but less than 5 hours.

39. A method for producing butene polymer as claimed in claim 1, wherein the temperature of contact in the step (III) of inorganic solid treating agent containing aluminum atoms with the butene polymer containing residual halogen is from 20° C to 300° C.

40. A method for removing halogen as an impurity as claimed in claim 6, wherein the temperature of contact of said inorganic solid treating agent with the organic compound is from 20° C. to 300° C.

41. A method for removing halogen as an impurity as claimed in claim 14 wherein the isobutene is a starting material of $C_4$ components containing less than 50% by mass of 1-butene, less than 50% by mass of 2-butene, less than 100% by mass of isobutene, less than 50% by mass of butanes and less than 10% by mass of butadiene.

42. A method for removing halogen as an impurity as claimed in claim 20, wherein said monoolefin containing a halogen compound as an impurity is the one which was subjected to catalytic action with a halogen-containing catalyst.

43. A method for removing halogen as an impurity as claimed in claim 42, wherein said monoolefin which was subjected to catalytic action with a halogen-containing catalyst is a residual unreacted $C_4$ fraction obtained from the production of butene polymer with a halogen-containing catalyst using a $C_4$ starting material.

* * * * *